United States Patent
Roth et al.

(10) Patent No.: US 7,358,311 B2
(45) Date of Patent: Apr. 15, 2008

(54) CROSSLINKING OF UNSATURATED POLYMERS BY THE USE OF HYDROXYLAMINE-ESTERS

(75) Inventors: Michael Roth, Lautertal (DE); Dirk Simon, Mutterstadt (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 390 days.

(21) Appl. No.: 10/490,488

(22) PCT Filed: Sep. 17, 2002

(86) PCT No.: PCT/EP02/10403

§ 371 (c)(1),
(2), (4) Date: Mar. 22, 2004

(87) PCT Pub. No.: WO03/029332

PCT Pub. Date: Apr. 10, 2003

(65) Prior Publication Data

US 2004/0265509 A1 Dec. 30, 2004

(30) Foreign Application Priority Data

Sep. 25, 2001 (EP) .................................. 01810933

(51) Int. Cl.
*C08K 5/3432* (2006.01)
*C08C 19/22* (2006.01)

(52) U.S. Cl. ................ 525/375; 525/328.8; 525/329.5; 525/374; 525/377; 525/380

(58) Field of Classification Search ............. 525/329.5, 525/374, 375, 377, 380, 328.8
See application file for complete search history.

(56) References Cited

U.S. PATENT DOCUMENTS 5,112,890 A * 5/1992 Behrens et al. ............... 524/95
6,949,594 B2 * 9/2005 Roth et al. .................... 524/99

FOREIGN PATENT DOCUMENTS

WO      01/92397      12/2001

OTHER PUBLICATIONS

U.S. Appl. No. 10/477,364 filed May 7, 2002 "Method of Grafting Ethylenically Unsaturated Carboxylic Acid Derivatives Onto Thermoplastic Polymers Using Hydroxylamine Esters".

* cited by examiner

*Primary Examiner*—Roberto Rabago
(74) *Attorney, Agent, or Firm*—Tyler A. Stevenson

(57) ABSTRACT

The instant invention relates to a process for crosslinking unsaturated polymer resins as e.g. unsaturated polyesters using hydroxyamine esters as radical source. Further aspects of the invention are a composition comprising unsaturated polymer resins as e.g. unsaturated polyester resins and a hydroxylamine ester and the use of hydroxylamine esters for crosslinking unsaturated polymers.

14 Claims, No Drawings

CROSSLINKING OF UNSATURATED POLYMERS BY THE USE OF HYDROXYLAMINE-ESTERS

The instant invention relates to a process for crosslinking unsaturated polymer resins as e.g. unsaturated polyesters using hydroxylamine esters as radical source. Further aspects of the invention are a composition comprising unsaturated polymer resins as e.g. unsaturated polyester resins and a hydroxylamine ester and the use of hydroxylamine esters for crosslinking unsaturated polymers.

Thermally initiated radical crosslinking of oligomers or polymers, which contain unsaturated groups, is a convenient process to produce duroplastic articles. Suitable resins are for instance unsaturated polyesters, prepolymers based on vinylesters, acrylates, methacrylates or polyurethanes. The crosslinking reaction can be carried out with the pre-polymer itself or in combination with radically copolymerizable monomers, for instance styrene, diallylphthalate or methylmethacrylate.

Most widely used are unsaturated polyester resins or mixtures of unsaturated polyesters with monomers and other prepolymers.

Unsaturated polyester resins (UP) are polycondensation products based on unsaturated and saturated acids/anhydrides and diols or oxides. These resins are generally oligomers with a low degree of polymerization, such as for example with a molecular weight of 1000-5000 Dalton. Depending on the chemical composition and molecular weight, these oligomers may be viscous liquids or brittle solids. The unsaturation in the backbone provides sites for reaction with vinyl monomers using thermal free radical initiators, thereby leading to the formation of a three dimensional network.

Commercially available unsaturated polyester resins are usually blends or solutions of the polyester resin in a vinyl monomer such as for example styrene, diallylphthalate, methylacrylate or methylmethacrylate. These monomers are frequently called reactive diluents since they react with the unsaturated polyester resin during the crosslinking (curing) reaction.

Unsaturated polyester resins are widely used for a variety of applications in the construction, transportation and electric and electronic industry. The biggest use is in polymeric composites, such as glass-fiber-reinforced articles. The resins can be cured over a wide temperature range from room temperature i. e. ambient condition up to 150° C. using for example a peroxide as radical source.

When the unsaturated polymer resin is crosslinked (cured) by a thermal process, a peroxide, hydroperoxide or a perester must be added to produce free radicals. For example methylethylketon peroxide (MEKP) and dibenzoyl peroxide, partly in combination with radical building activators (e.g. diethylanilin, Co-octanoate), are used as initiators in ambient cure applications. Curing processes at a temperature between 60° C. and 90° C. often use dibenzoyl peroxide. Hot-curing in compression molding and in ovens at a temperature between 130° C. and 150° C. can be initiated by peroxides, such as di-tert-butyl peroxide, tert-butylperbenzoate, butylperethylhexanoate, 1,1-di(tert-butyl-peroxy)-3,3,5-trimethylcyclohexane and dicumyl peroxide.

The use of radical building activators, or so-called accelerators, in UP-resins together with peroxides is well known. For example B. Parkyn et al. (Ullmann's Encyclopedia of Industrial Chemistry, Polyesters Volume 2, publ. London ILIFFE Books, 1967, page 60-64) mentions metal salts such as e.g. salts based on Cerium, Cobalt (most commonly Co-octanoate), Vanadium, Iron. Also tert. amines, such as e.g. N,N-dimethylaniline, N-N-diethylaniline, N-N-dimethyl-p-toluidine, N,N-bis-2-hydroxyethylaniline may be added. Another group are sulfur containing compounds, such as sulphur dioxide, hydrogen sulphide, mercaptanes, in particular lauryl (dodecyl)mercaptane or p-toluenesulphinic acid. Also suitable are benz-amidine hydrochloride or styrene oxide.

When the radical initiators and optionally accelerators are added, the formulation must be processed shortly after their addition, since storage stability decreases dramatically. A further drawback of the conventionally used radical initiators is, that severe precautions have to be made for storing these initiators.

As mentioned before UP-resins, for example, are often available as solution of the unsaturated polyester in styrene monomer. The volatility of styrene leads to odor problems, furthermore safety requirements (good ventilation, monomer stable gloves and staff clothing, respiratory masks) need to be fulfilled. Therefore, solid or semisolid resin systems were developed recently, reducing substantially the problems of odor and safety requirements.

However due to their lower fluidity at moderate temperatures (60° C.-90° C.), it is necessary to process and cure particularly the solid UP-resins at higher temperatures. Curing at a temperature above 140° C. with conventional radical initiators is however problematic because a substantial amount of the initiator degrades already during the heating-phase, which consequently does not contribute to the initiation process. The degradation leads to a rather bad radical yield and subsequently to heterogeneous duroplastic materials with inferior mechanical properties.

This can also occur with liquid resins if, for instance, molds with high wall thickness are produced. During the curing process, polymerization energy is released and the mold is substantially heated. Consequently, the duroplastic material may become heterogeneous and contain amounts of residual monomers resulting in bad mechanical properties. Compromising by reducing the cure temperature leads to an undesirable increase of the process cycle time.

It is therefore desirable to provide an initiator system which leads to formulations with high storage stability, low volatility and allows curing of unsaturated polymer resins at higher temperatures, such as for example >140° C., without sacrificing the final mechanical properties of the cured polymer.

Surprisingly it has been found that with the instant hydroxylamine esters a remarkably prolonged storage stability can be achieved, even at higher storage temperatures. The curing process results in more homogeneous hot cure, curing times can become shorter and conversion is in many cases higher than with peroxides, resulting in a lower content of residual monomers.

The cured article has in many cases better mechanical properties as compared to conventionally cured resins.

In addition the hydroxyl amine esters cause substantially less safety issues during transport, storage and use, compared to peroxides.

One aspect of the invention is a process for crosslinking unsaturated polymer resins, which process comprises heating the polymer resin together with a hydroxylamine ester having a structural element of formula (I) or formula (I') or with a polymeric hydroxylamine ester having a repetitive structural unit of formula (II) or (II')

(I)

[chemical structure: N(CH3)2—O—C(=O)—X]

(I')

[chemical structure: (CH3)2N—O—C(=O)—X'—C(=O)—O—N(CH3)2]

(II)

[chemical structure: piperidine ring with G5, G4, G3, G6, G2, G1 substituents, N—O—C(=O)—, and —O— at the 4-position]

(II')

[chemical structure: piperidine ring with G5, G4, G3, G6, G2, G1 substituents, N—O—C(=O)—, and —N(R1)— at the 4-position]

wherein
X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylen, $C_1$-$C_{36}$alkenylen, $C_1$-$C_{36}$alkinylen, -($C_1$-$C_6$alkylen)-phenyl-($C_1$-$C_6$alkylen) or a group

[chemical structures showing branched alkyl/alkenyl chains and fused ring structures with attachment points]

$G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$-$C_4$ alkyl;

$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl.

Preferably the heating temperature is of from 140° C. to 250° C., more preferably of from 150° C. to 200° C. and most preferably of from 160° C. to 200° C., with the proviso that no accelerator is additionally present.

If an accelerator is added, the curing temperature is preferably decreased by 30° C. to 50° C. and is in general between 100 and 150° C., in particular between 110° C. and 135° C.

Unsaturated polymers are pre-polymers containing mostly ethylenically unsaturated groups, for example unsaturated polyesters and pre-polymers based on vinylesters, acrylates, methacrylates or polyurethanes containing unsaturation in the polymer backbone chain or in a side-chain. Examples of higher molecular weight (oligomeric, polymeric) polyunsaturated compounds are acrylated epoxy resins, acrylated or vinyl-ether- or epoxy-group-containing polyesters, polyurethanes and polyethers. In addition it is also possible to use vinyl ether monomers and oligomers, and also maleate-terminated oligomers having polyester, polyurethane, polyether, polyvinyl ether and epoxide main chains. Combinations of vinyl-ether-group-carrying oligomers and polymers, as described in WO 90/01512, are also suitable, but copolymers of vinyl ether and monomers functionalised with maleic acid also come into consideration.

Particularly suitable prepolymers are vinyl ester polymers, also known under the name of epoxy (meth)acrylates, which are the addition products of polyepoxides and unsaturated carboxylic acids, preferably acrylic acid and methacrylic acid. Suitable polyepoxides are epoxy novolak resins and in particular polyepoxides based on bisphenol A. Other suitable vinyl esters are the esterification products of alkoxylated bisphenol A and (meth)acrylic acid. These resins are commericially available (e.g. Epocryl®, Derakane®, such as Derakane® 411-45 ex Dow Chem.

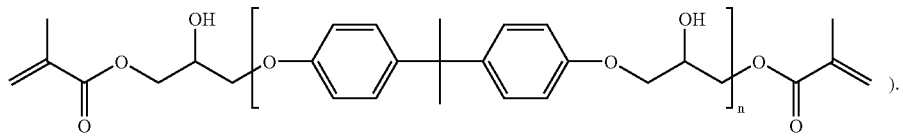

Another particularly suitable class of prepolymers are the vinyl ester urethane polymers. Vinyl ester urethane polymers, also known under the name urethane (meth)acrylates, are the addition products of a polyvalent isocyanate, a polyvalent alcohol or amine and a hydroxyalkyl (meth)acrylate.

Preferably the unsaturated polymer is an unsaturated polyester resin, which may optionally be dissolved or mixed with a monomer.

Unsaturated polyesters are the condensation products of polyfunctional mostly difunctional carboxylic acids and their for esterfication accessible derivatives, especially their esters or anhydrides, and polyfunctional mostly difunctional alcohols. At least one of the starting materials then contains unsaturated bonds.

Examples of suitable di- or polyvalent carboxylic acids are fumaric acid, maleic acid, chloromaleic acid, itaconic acid, citraconic acid, malonic acid, succinic acid, glutaric acid, methylglutaric acid, adipic acid, sebacic acid, 1,4-cyclohexanedicarboxylic acid, phthalic acid, isophthalic acid, terephthalic acid, trimellitic acid, dihydrophthalic acid tetrahydrophthalic acid, hexahydrophthalic acid, tetrachlorophthalic acid, endomethylene tetrahydrophthalic acid (HIMIC), hexachlorochloro endomethylene tetrahydrophthalic acid and/or the corresponding esters or anhydrides.

The unsaturated carboxylic acids to be used are preferably ethylenically unsaturated carboxylic acids, in particular α,β-ethylenically unsaturated carboxylic acids. It is preferred that the polyester contains fumaric acid, maleic acid and/or terephthalic acid as carboxylic acid units. Also dicyclopentadiene modified resins as described in, for instance, EP-A-0783026 can be used.

When unsaturated di-carboxylic acids are condensated with diols, the unsaturated functionality is in the backbone of the unsaturated polyester. It is however also possible to react monocarboxylic unsaturated acids with remaining hydroxy groups to have the unsaturated functionality in the side chain of the polyester.

Examples of unsaturated carboxylic acids are acrylic acid, methacrylic acid, crotonic acid, itaconic acid, cinnamic acid and unsaturated fatty acids such as linolenic acid or oleic acid. Acrylic and methacrylic acid are preferred.

Suitable polyols are aromatic and especially aliphatic and cycloaliphatic polyols. Examples of aromatic polyols are hydroquinone, 4,4'-dihydroxydiphenyl, 2,2-di(4-hydroxyphenyl)propane, and novolaks and resols. Examples of polyepoxides are those based on the said polyols, especially the aromatic polyols and epichlorohydrin. Also suitable as polyols are polymers and copolymers that contain hydroxyl groups in the polymer chain or in side groups, e.g. polyvinyl alcohol and copolymers thereof or polymethacrylic acid hydroxyalkyl esters or copolymers thereof. Further suitable polyols are oligoesters having hydroxyl terminal groups.

Examples of aliphatic and cycloaliphatic polyols include alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be partially or fully esterified by one or by different unsaturated carboxylic acid(s), it being possible for the free hydroxyl groups in partial esters to have been modified, for example etherified, or esterified by other carboxylic acids.

Examples of esters are:
trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol di- and tri-acrylate, 1,4-cyclohexane diacrylate, bisacrylates and bismethacrylates of polyethylene glycol having a molecular weight of from 200 to 1500, and mixtures thereof.

The unsaturated polymer resins can contain different unsaturated resins (prepolymers), examples for unsaturated prepolymers have already been given above.

The unsaturated polymer resins preferably contain an additional monomer.

Examples of monomers having a double bond are alkyl and hydroxyalkyl acrylates and methacrylates, e.g. methyl, ethyl, butyl, 2-ethylhexyl and 2-hydroxyethyl acrylate, isobornyl acrylate and methyl and ethyl methacrylate. Also of interest are silicone acrylates. Further examples are acrylonitrile, acrylamide, methacrylamide, N-substituted (meth)acrylamides, vinyl esters, such as vinyl acetate, vinyl ethers, such as isobutyl vinyl ether, styrene, alkyl- and halo-styrenes, N-vinylpyrrolidone, vinyl chloride and vinylidene chloride.

Examples of monomers having several double bonds are ethylene glycol diacrylate, propylene glycol diacrylate, neopentyl glycol diacrylate, hexamethylene glycol diacrylate, bisphenol-A diacrylate, 4,4'-bis(2-acryloyloxyethoxy)diphenylpropane, trimethylolpropane triacrylate, pentaerythritol triacrylate, pentaerythritol tetraacrylate, vinyl acrylate, divinylbenzene, divinyl succinate, diallyl phthalate, triallyl phosphate, triallyl isocyanurate and tris(2-acryloylethyl) isocyanurate.

Preferred monomers are styrene, α-methylstyrene, diallylphthalate, vinyltoluene, 1,3,5-triallyl-2,4,5-trioxohexahydro-1,3,5-triazin, methyl(meth)acrylate, 2-hydroxyethyl-(meth)acrylate, 2-ethylhexyl-acrylate, 1,4-butandiol-di(meth)acrylate, polyethylenglycol-di(meth)acrylate, trimethylolpropan-tri(meth)acrylate, polyurethan(meth)acrylate, 3,3,5-trimethylcyclohexyl(meth)acrylate.

Particularly preferred is styrene.

The weight ratio of unsaturated polymers to monomer ranges preferably between 20:80 and 99,9:0,1; more preferably between 50:50 and 95:5 and most preferably between 60:40 and 85:15.

The above mentioned unsaturated polyesters, prepolymers and monomers as well as suitable mixtures thereof are for example described in WO 00/69971 or in DE 19618015. The various components are largely items of commerce.

Preferred is a process, wherein the hydroxylamine ester is of formula (Ia) or (I'a)

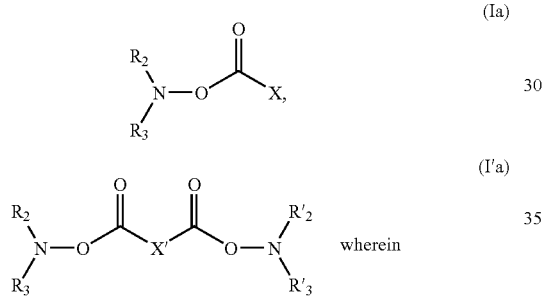

X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylen, $C_1$-$C_{36}$alkenylen, $C_1$-$C_{36}$alkinylen, -($C_1$-$C_6$alkylen)-phenyl-($C_1$-$C_6$alkylen) or a group

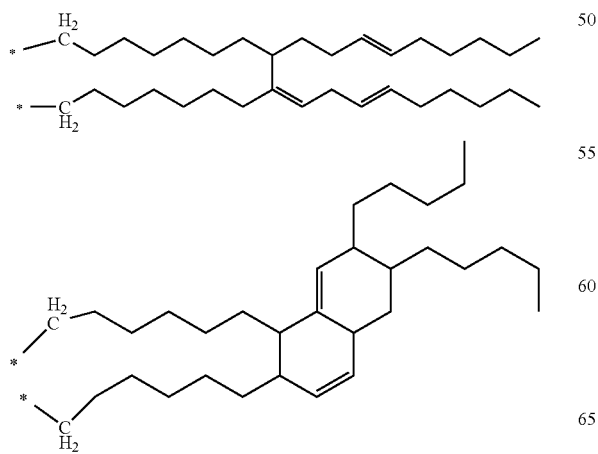

$R_2$, $R_3$, $R_2'$ and $R_3'$ are independently unsubstituted $C_1$-$C_{18}$alkyl, $C_2$-$C_{18}$alkenyl, $C_2$-$C_{18}$alkinyl or with halogen, CN, $NO_2$ or —COOR$_4$ substituted or with O or NR$_4$ interrupted $C_1$-$C_{18}$alkyl, $C_2$-$C_{18}$alkenyl or $C_2$-$C_{18}$alkinyl;

$R_4$ is H, phenyl or $C_1$-$C_{18}$alkyl; or $R_2$ and $R_3$ and/or $R_2'$ and $R_3'$ together with the nitrogen atom to which they are bound form a 5 or 6 membered ring which may be interrupted by a nitrogen or oxygen atom and which may be substituted by one or more $C_1$-$C_6$alkyl groups, carboxyl groups, $C_1$-$C_{18}$alkoxy groups, $C_1$-$C_{18}$alkanoyloxy groups.

A 6 membered ring is generally preferred.

More preferred is a process wherein the structural element of formula (I) is of formulae A to S

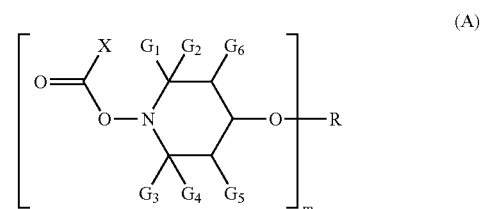

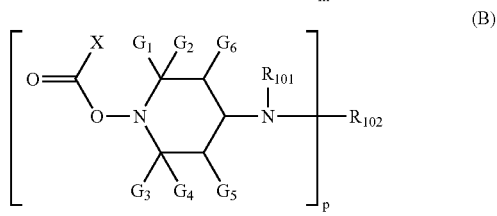

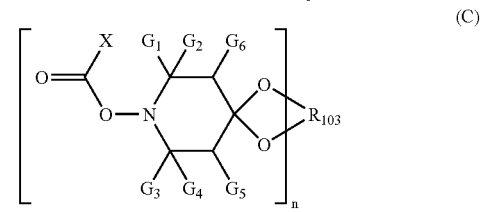

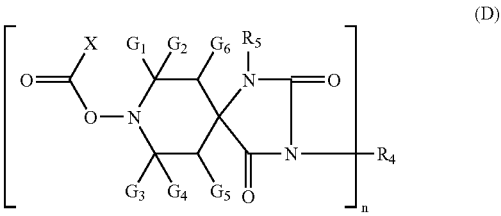

-continued
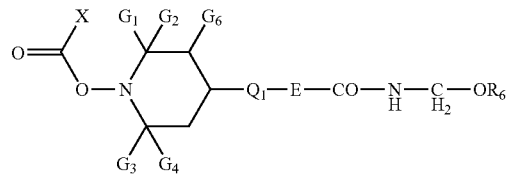  (E)
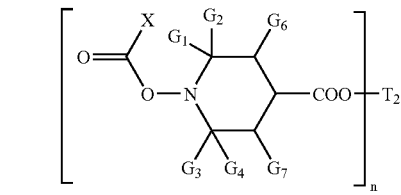  (F)
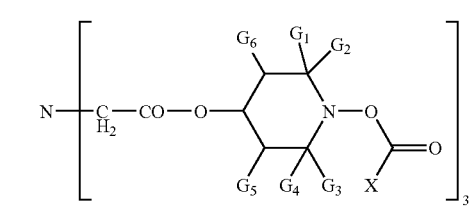  (G)
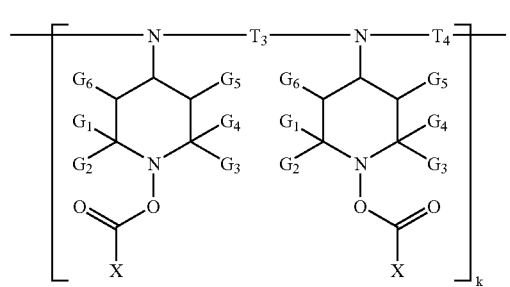  (H)
(I)
-continued
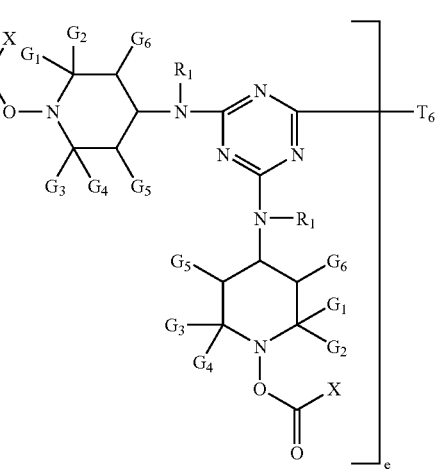  (K)
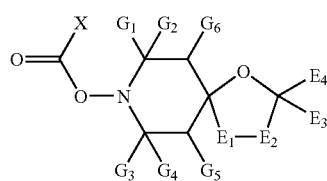  (L)
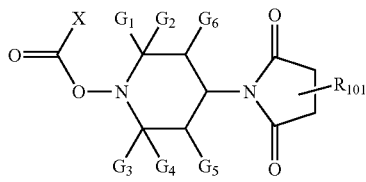  (M)
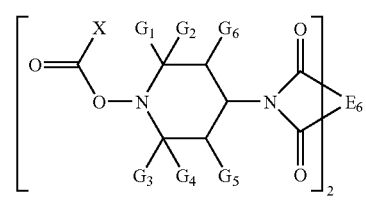  (N)
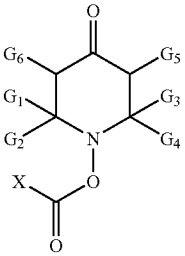  (O)
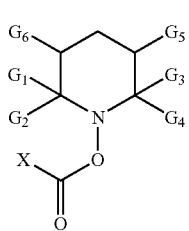  (P)

-continued

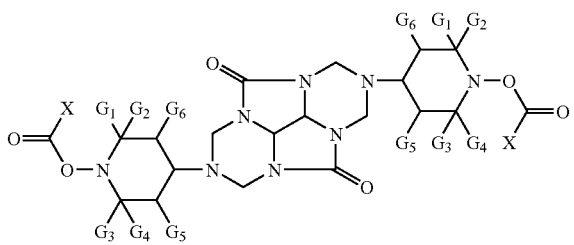

(Q)

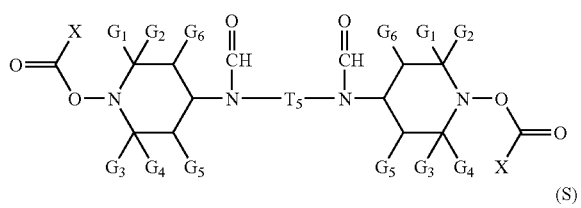

(R)

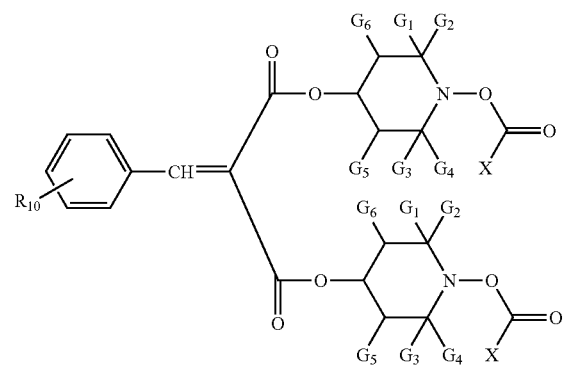

(S)

wherein

G$_1$, G$_2$, G$_3$ and G$_4$ are independently alkyl of 1 to 4 carbon atoms, or G$_1$ and G$_2$ together and G$_3$ and G$_4$ together, or G$_1$ and G$_2$ together or G$_3$ and G$_4$ together are pentamethylene;

G$_5$ and G$_6$ are independently hydrogen or C$_1$-C$_4$ alkyl;

R, if m is 1, is hydrogen, C$_1$-C$_{18}$alkyl which is uninterrupted or C$_2$-C$_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —COOZ$_{12}$ groups, in which Z$_{12}$ is H, C$_1$-C$_{20}$alkyl, C$_3$-C$_{12}$alkenyl, C$_5$-C$_7$cycloalkyl, phenyl or benzyl; or R is a monovalent radical of a carbamic acid or phosphorus-containing acid or a monovalent silyl radical;

R, if m is 2, is C$_2$-C$_{12}$alkylene, C$_4$-C$_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms, where each dicarboxylic acid may be substituted in the aliphatic, cycloaliphatic or aromatic moiety by one or two —COOZ$_{12}$ groups; or R is a divalent radical of a phosphorus-containing acid or a divalent silyl radical;

R, if m is 3, is a trivalent radical of an aliphatic, cycloaliphatic or aromatic tricarboxylic acid, which may be substituted in the aliphatic, cycloaliphatic or aromatic moiety by —COOZ$_{12}$, of an aromatic tricarbamic acid or of a phosphorus-containing acid, or is a trivalent silyl radical, R, if m is 4, is a tetravalent radical of an aliphatic, cycloaliphatic or aromatic tetracarboxylic acid;

p is 1, 2 or 3,

R$_{101}$ is C$_1$-C$_{12}$alkyl, C$_5$-C$_7$cycloalkyl, C$_7$-C$_8$aralkyl, C$_2$-C$_{18}$alkanoyl, C$_3$-C$_5$alkenoyl or benzoyl;

when p is 1,

R$_{102}$ is C$_1$-C$_{18}$alkyl, C$_5$-C$_7$cycloalkyl, C$_2$-C$_8$alkenyl unsubstituted or substituted by a cyano, carbonyl or carbamide group, or is glycidyl, a group of the formula —CH$_2$CH(OH)-Z or of the formula —CO-Z- or —CONH-Z wherein Z is hydrogen, methyl or phenyl; or when p is 2, R$_{102}$ is C$_2$-C$_{12}$alkylene, C$_6$-C$_{12}$arylene, xylylene, a —CH$_2$CH(OH)CH$_2$—O—B—O—CH$_2$CH(OH)CH$_2$- group, wherein B is C$_2$-C$_{10}$alkylene, C$_6$-C$_{15}$arylene or C$_6$-C$_{12}$cycloalkylene; or, provided that R$_{101}$ is not alkanoyl, alkenoyl or benzoyl, R$_{102}$ can also be a divalent acyl radical of an aliphatic, cycloaliphatic or aromatic dicarboxylic acid or dicarbamic acid, or can be the group —CO—; or R$_{101}$ and R$_{102}$ together when p is 1 can be the cyclic acyl radical of an aliphatic or aromatic 1,2- or 1,3-dicarboxylic acid; or R$_{102}$ is a group

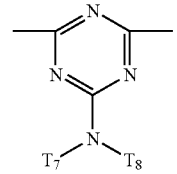

where T$_7$ and T$_8$ are independently hydrogen, alkyl of 1 to 18 carbon atoms, or T$_7$ and T$_8$ together are alkylene of 4 to 6 carbon atoms or 3-oxapentamethylene;

when p is 3,

R$_{102}$ is 2,4,6-triazinyl;

when n is 1,

R$_{103}$ is C$_2$-C$_8$-alkylene or hydroxyalkylene or C$_4$-C$_{32}$acyloxyalkylene; or when n is 2, R$_{103}$ is (—CH$_2$)$_2$C(CH$_2$—)$_2$;

when n is 1,

R$_4$ is hydrogen, C$_1$-C$_{12}$alkyl, C$_3$-C$_5$alkenyl, C$_7$-C$_9$aralkyl, C$_5$-C$_7$cycloalkyl, C$_2$-C$_4$hydroxyalkyl, C$_2$-C$_6$alkoxyalkyl, C$_6$-C$_{10}$aryl, glycidyl, a group of formula —(CH$_2$)$_m$—COO-Q or of the formula —(CH$_2$)$_m$—O—CO-Q wherein m is 1 or 2 and Q is C$_1$-C$_4$alkyl or phenyl; or when n is 2, R$_4$ is C$_2$-C$_{12}$alkylene, C$_6$-C$_{12}$arylene, a group —CH$_2$CH(OH)CH$_2$—O-D-O—CH$_2$CH(OH)CH$_2$— wherein D is C$_2$-C$_{10}$alkylene, C$_6$-C$_{15}$arylene or C$_6$-C$_{12}$cycloalkylene, or a group—CH$_2$CH(OZ$_1$)CH$_2$—(OCH$_2$CH(OZ$_1$)CH$_2$)$_2$— wherein Z$_1$ is hydrogen, C$_1$-C$_{18}$alkyl, allyl, benzyl, C$_2$-C$_{12}$alkanoyl or benzoyl;

R$_5$ is hydrogen, C$_1$-C$_{12}$alkyl, allyl, benzyl, glycidyl or C$_2$-C$_6$alkoxyalkyl;

Q$_1$ is —N(R$_7$)— or —O—;

E is C$_1$-C$_3$alkylene, the group —CH$_2$CH(R$_8$)—O— wherein R$_8$ is hydrogen, methyl or phenyl, the group —(CH$_2$)$_3$—NH— or a direct bond;

$R_7$ is $C_1$-$C_{18}$alkyl, $C_5$-$C_7$-cycloalkyl, $C_7$-$C_{12}$aralkyl, cyanoethyl, $C_6$-$C_{10}$-aryl, the group —CH$_2$CH(R$_8$)—OH; or a group of the formula

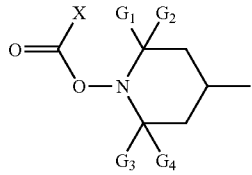

or a group of the formula

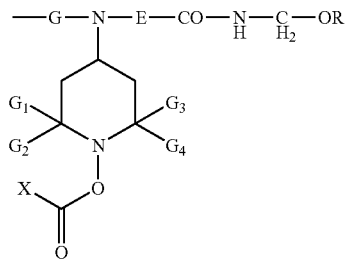

wherein

G is $C_2$-$C_6$alkylene or $C_6$-$C_{12}$arylene and R is as defined above; or $R_7$ is a group -E-CO—NH—CH$_2$—OR$_6$;

$R_6$ is hydrogen or $C_1$-$C_{18}$alkyl;

Formula (F) denotes a recurring structural unit of a oligomer where T is ethylene or 1,2-propylene, or is a repeating structural unit derived from an α-olefin copolymer with an alkyl acrylate or methacrylate;

k is 2 to 100;

$R_{10}$ is hydrogen, $C_1$-$C_{12}$alkyl or $C_1$-$C_{12}$alkoxy;

$T_2$ has the same meaning as $R_4$;

$T_3$ and $T_4$ are independently alkylene of 2 to 12 carbon atoms, or $T_4$ is a group

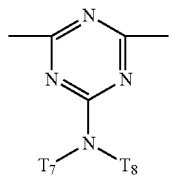

$T_5$ is $C_2$-$C_{22}$alkylene, $C_5$-$C_7$cycloalkylene, $C_1$-$C_4$alkylenedi($C_5$-$C_7$cycloalkylene), phenylene or phenylenedi($C_1$-$C_4$alkylene);

where a, b and c are independently 2 or 3, and d is 0 or 1;

e is 3 or 4;

$T_7$ and $T_8$ are independently hydrogen $C_1$-$C_{18}$alkyl, or $T_7$ and $T_8$ together are $C_4$-$C_6$alkylene or 3-oxapenthamethylene;

$E_1$ and $E_2$, being different, each are —CO— or —N(E$_5$)—, where $E_5$ is hydrogen, $C_1$-$C_{12}$alkyl or $C_4$-$C_{22}$alkoxycarbonylalkyl;

$E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms;

$E_4$ is hydrogen, alkyl of 1 to 30 carbon atoms, phenyl, naphthyl or phenylalkyl of 7 to 12 carbon atoms; or $E_3$ and $E_4$ together are polymethylene of 4 to 17 carbon atoms, or said polymethylene substituted by up to four alkyl groups of 1 to 4 carbon atoms; and $E_6$ is an aliphatic or aromatic tetravalent radical.

$C_3$-$C_{12}$alkenyl is for example propenyl, butenyl, pentenyl, hexenyl, heptenyl, octenyl, dodecenyl including their isomers.

$C_7$-$C_9$aralkyl is for example benzyl, phenylpropyl, α,α-dimethylbenzyl or α-methylbenzyl.

$C_2$-$C_{18}$alkyl interrupted by at least one O atom is for example —CH$_2$—CH$_2$—O—CH$_2$—CH$_3$, —CH$_2$—CH$_2$—O—CH$_3$ or —CH$_2$—CH$_2$—O—CH$_2$—CH$_2$—CH$_2$—O—CH$_2$—CH$_3$. It is preferably derived from polyethlene glycol. A general description is —((CH$_2$)$_a$—O)$_b$-H/CH$_3$, wherein a is a number from 1 to 6 and b is a number from 2 to 10.

If R is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If R is a monovalent silyl radical, it is, for example, a radical of the formula —(C$_j$H$_{2j}$)—Si(Z')$_2$Z'', in which j is an integer in the range from 2 to 5, and Z' and Z'', independently of one another, are $C_1$-$C_4$alkyl or $C_1$-$C_4$alkoxy.

If R is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl)malonyl or bicycloheptenedicarbonyl radical or a group of the formula

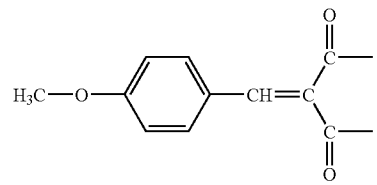

If R is a trivalent radical of a tricarboxylic acid, it is, for example, a trimellitoyl, citryl or nitrilotriacetyl radical.

If R is a tetravalent radical of a tetracarboxylic acid, it is, for example, the tetravalent radical of butane-1,2,3,4-tetracarboxylic acid or of pyromellitic acid.

If R is a divalent radical of a dicarbamic acid, it is, for example, hexamethylenedicarbamoyl or 2,4-toluylenedicarbamoyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

Any $C_2$-$C_{12}$alkylene radicals are, for example, ethylene, propylene, 2,2-dimethylpropylene, tetramethylene, hexamethylene, octamethylene, decamethylene or dodecamethylene.

Any $C_6$-$C_{15}$arylene substituents are, for example, o-, m- or p-phenylene, 1,4-naphthylene or 4,4'-diphenylene.

$C_6$-$C_{12}$cycloalkylene is, in particular, cyclohexylene.

Hydroxyl-, cyano-, alkoxycarbonyl- or carbamide-substituted $C_1$-$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Suitable $C_2$-$C_{32}$acyloxyalkylene radicals are for example shown in formulae 143, 144, 145, 146 and 159 of Table A.

A preferred subgroup of hydroxylamine esters is of formula A, B or C and the substiutents are as defined above.

From this subgroup particularly preferred hydroxylamine esters are of formula A, B or C

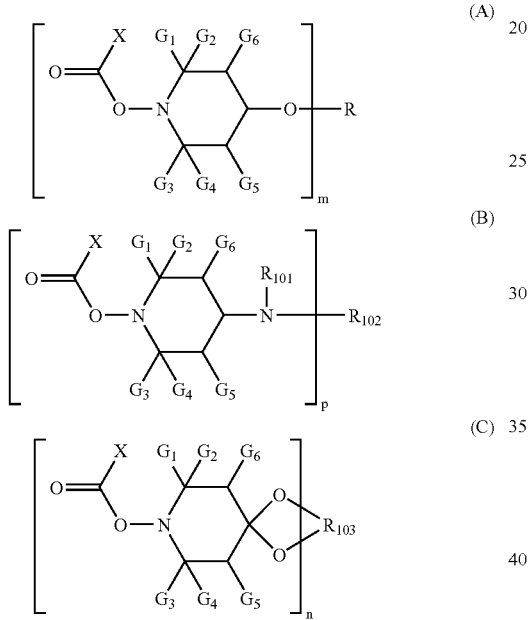

wherein $G_1$, $G_2$, $G_3$ and $G_4$ are methyl or $G_1$ and $G_3$ are methyl and $G_2$ and $G_4$ are ethyl or $G_1$ and $G_2$ are methyl and $G_3$ and $G_4$ are ethyl;

$G_5$ and $G_6$ are independently hydrogen or methyl;

m is 1;

R is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z- or —CONH-Z wherein Z is hydrogen, methyl or phenyl;

n is 1, $R_{103}$ is $C_2$-$C_8$alkylene or hydroxyalkylene or $C_4$-$C_{32}$acyloxyalkylene. and X is hydrogen, $C_1$-$C_{36}$alkyl or $C_6$-$C_{10}$aryl.

Most preferrably the hydroxylamine ester is of formula A or C;

$G_1$, $G_2$, $G_3$ and $G_4$ are methyl or $G_1$ and $G_3$ are methyl and $G_2$ and $G_4$ are ethyl;

$G_5$ and $G_6$ are independently hydrogen or methyl;

m is 1;

R is hydrogen, $C_1$-$C_{18}$alkyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms; and $R_{103}$ is $C_2$-$C_8$alkylene or hydroxyalkylene or $C_4$-$C_{32}$acyloxyalkylene In another preferred embodiment of the inventive process the hydroxylamineester is a oligomer or polymer obtainable by reacting a dicarboxylic acid or a dicarboxylic acid derivative with a compound of formula A1 or B1 or by reacting a diisocyanate with a compound of formula A1

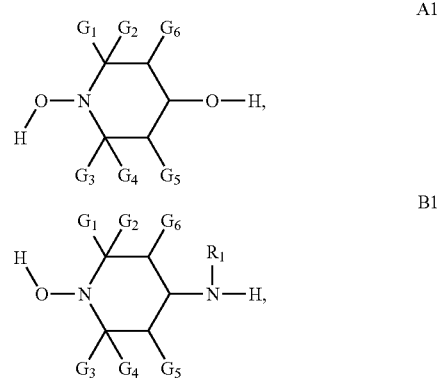

wherein the substituents $G_1$, $G_2$, $G_3$, $G_4$, $G_5$, $G_6$ and $R_1$ are as defined above.

The resulting polymers are polyesters, polyurethanes or polyester-urethanes. The polymers may be homopolymers or copolymers which are composed of aliphatic, cycloaliphatic or aromatic dicarboxylic acids and optionally a further diol.

The polymers can be prepared by direct esterification (PTA process) and also by transesterification (DMT process). Any of the known catalyst systems may be used for the preparation.

The aliphatic dicarboxylic acids can contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms and the aromatic and cycloaliphatic hydroxycarboxylic acids 7 to 14 carbon atoms.

When further diols are used these may be aliphatic, cycloaliphatic or aromatic diols. The aliphatic diols can contain 2 to 12 carbon atoms, the cycloaliphatic diol 5 to 8 carbon atoms and the aromatic diols 6 to 16 carbon atoms.

Polyoxyalkylene glycols having molecular weights from 150 to 40000 may also be used.

Aromatic diols are those in which two hydroxyl groups are bound to one or to different aromatic hydrocarbon radicals.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, for example oxalic acid, malonic acid, dimethylmalonic acid, succinic acid, pimelic acid, adipic acid, tri-methyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are: In particular terephthalic acid, isophthalic acid, o-phthalic acid, and 1,3-, 1,4-, 2,6- or 2,7-naphthalenedicarboxylic acid, 4,4'-diphenyldicarboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p-(carboxylphenyl)methane or bis-p-(carboxylphenyl)ethane.

The aromatic dicarboxylic acids are preferred, in particular terephthalic acid, isophthalic acid and 2,6-naphthalenedicarboxylic acid.

Other suitable dicarboxylic acids are those containing —CO—NH-groups; they are described in DE-A2414349. Dicarboxylic acids containing N-heterocyclic rings are also suitable, for example those which are derived from carboxylalkylated, carboxylphenylated or carboxybenzylated monoamine-s-triazinedicarboxylic acids (viz. DE-A-2121184 and 2533675), mono- or bishydantoins, optionally halogenated benzimidazoles or parabanic acid. The carboxyalkyl group can in this case contain 3 to 20 carbon atoms.

Suitable aliphatic diols are the linear and branched aliphatic glycols, in particular those containing 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is e.g. 1,4-dihydroxycyclohexane. Other suitable aliphatic diols are e.g. 1,4-bis(hydroxymethyl)cyclohexane, aromatic-aliphatic diols such as p-xylylene glycol or 2,5-dichloro-p-xylylene glycol, 2,2-(□-hydroxyethoxyphenyl)propane and also polyoxyalkylene glycols such as diethylene glycol, triethylene glycol, polyethylene glycol or polypropylene glycol. The alkylene diols are preferably linear and preferably contain 2 to 4 carbon atoms.

Preferred diols are the alkylenediols, 1,4-dihydroxycyclohexane and 1,4-bis(hydroxymethyl)-cyclohexane. Particularly preferred are ethylene glycol, 1,4-butanediol and 1,2- and 1,3-propylene glycol.

Other suitable aliphatic diols are the β-hydroxyalkylated, in particular β-hydroxyethylated, bisphenols such as 2,2-bis[4'-(β-hydroxyethoxy)phenyl]propane. Other bisphenols will be mentioned later.

Another group of suitable aliphatic diols are the heterocyclic diols described in DE-A-1812003, DE-A-2342432, DE-A-2342372 and DE-A-2453326, for example: N,N'-bis (β-hydroxyethyl)-5,5-dimethylhydantoin, N,N'-bis(β-hydroxypropyl)-5,5-dimethylhydantoin, methylenebis[N-(β-hydroxyethyl)-5-methyl-5-ethylhydantoin], methylenebis [N-(β-hydroxyethyl)-5,5-dimethylhydantoin], N,N'-bis(β-hydroxyethyl)benzimidazolone, N,N'-bis(β-hydroxyethyl)-(tetrachloro)benzimidazolone or N,N'-bis(β-hydroxyethyl)-(tetrabromo)benzimidazolone.

Suitable aromatic diols are mononuclear diphenols and, in particular dinuclear diphenols carrying a hydroxyl group at each aromatic nucleus. Aromatic will be taken to mean preferably hydrocarbonaromatic radicals, such as phenylene or naphthylene. Besides e.g. hydroquinone, resorcinol or 1,5-, 2,6- and 2,7-dihydroxynaphthalene, the bisphenols are to be mentioned in particular, which can be represented by the following formulae:

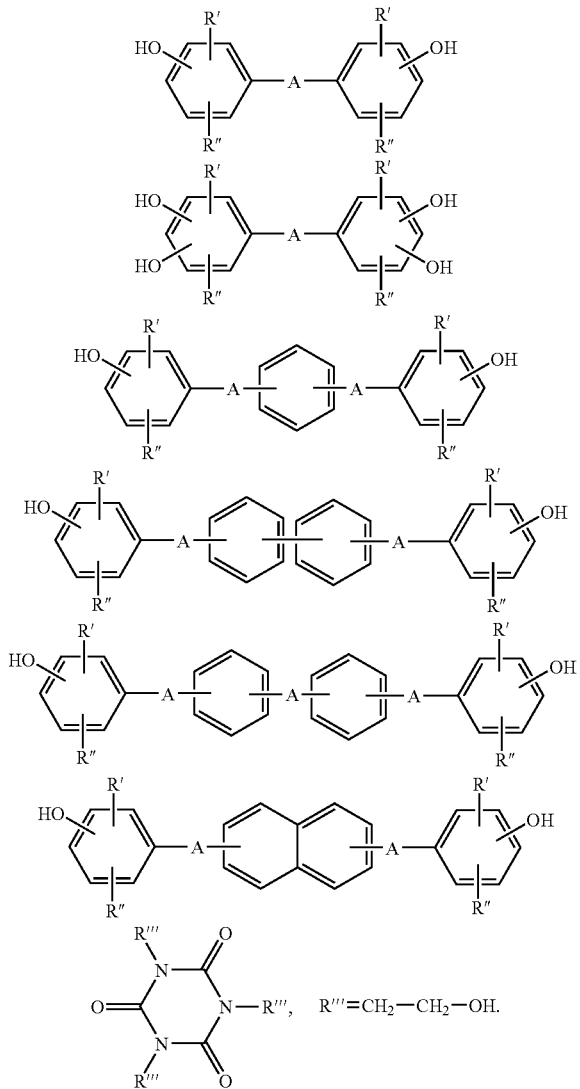

The hydroxyl groups can be in m-position, preferably in p-position, and R' and R" in these formulae can be alkyl containing 1 to 6 carbon atoms, halogen, such as chloro or bromo, and, in particular, hydrogen atoms. A may be a direct bond or —O—, —S—, —(O)S(O)—, —C(O)—, —P(O)($C_1$-$C_{20}$alkyl)-, unsubstituted or substituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloroethylidene, trichloroethylidene.

Examples of unsubstituted or substituted alkylene are methylene, ethylene, phenylmethylene, diphenylmethylene, methylphenylmethylene. Examples of cycloalkylidene are cyclopentylidene, cyclohexylidene, cycloheptylidene and cyclooctylidene.

Examples of bisphenols are: bis(p-hydroxyphenyl) ether or bis(p-hydroxyphenyl) thioether, bis(p-hydroxyphenyl) sulfone, bis(p-hydroxyphenyl)methane, bis(4-hydroxyphenyl)-2,2'-biphenyl, phenylhydroquinone, 1,2-bis(p-hydroxyphenyl)ethane, 1-phenylbis(p-hydroxyphenyl)ethane, diphenylbis(p-hydroxyphenyl)methane, diphenylbis(p-hydroxyphenyl)ethane, bis(3,5-dimethyl-4-hydroxyphenyl) sulfone, bis(3,5-dimethylhydroxyphenyl)-p-diisopropylbenzene, bis(3,5-dimethyl-4-hydroxyphenyl)-m-diisopropylbenzene 2,2-bis(3',5'-dimethyl-4'-hydroxyphenyl)propane, 1,1- or 2,2-bis(p-hydroxyphenyl)butane, 2,2-bis(p-hydroxyphenyl)hexafluoropropane, 1,1-dichloro- or 1,1,1-trichloro-2,2-bis(p-hydroxyphenyl)ethane, 1,1-bis(p-hydroxyphenyl)cyclopentane and, in particular, 2,2-bis(p-hydroxyphenyl)propane (bisphenol A) and 1,1-bis(p-hydroxyphenyl)cyclohexane (bisphenol C).

Suitable polyesters of hydroxycarboxylic acids are, for example, polycaprolactone, polypivalolactone or the polyesters of 4-hydroxycyclohexancarboxylic acid, 2-hydroxy-6-naphthalene carboxylic acid or 4-hydroxybenzoic acid.

Specific useful single compounds are summarized in Table A.

TABLE A

| No. | Formula |
|---|---|
| 101 | |
| 102 | |
| 103 | |

TABLE A-continued

| No. | Formula |
|-----|---------|
| 104 | (structure) |
| 105 | (structure) |
| 106 | (structure) |
| 107 | (structure) |
| 108 | (structure) |
| 109 | (structure) |
| 110 | (structure) |

TABLE A-continued

| No. | Formula |
|-----|---------|
| 111 | |
| 112 | |
| 113 | |
| 114 | |
| 115 | |

TABLE A-continued

| No. | Formula |
|-----|---------|
| 119 | |
| 120 | |
| 121 | |
| 122 | |
| 123 | |
| 124 | |

TABLE A-continued
| No. | Formula |
|---|---|
| 125 | 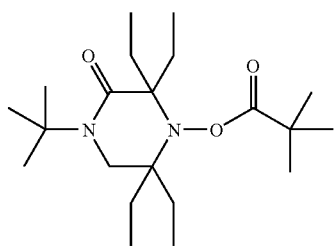 |
| 126 | 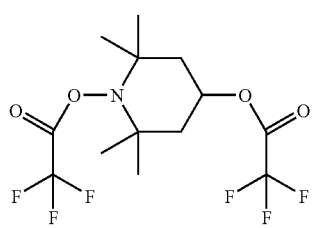 |
| 127 | 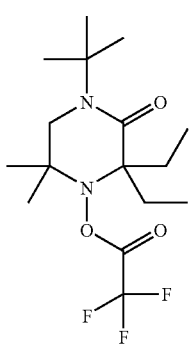 |
| 128 | 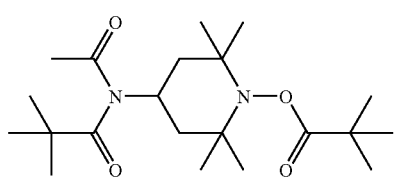 |
| 129 | 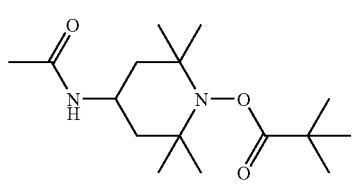 |
| 130 | 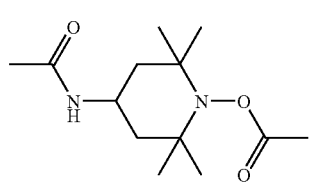 |

TABLE A-continued

| No. | Formula |
|---|---|
| 131 | |
| 132 | |
| 133 | |
| 134 | |
| 139 | |

TABLE A-continued

| No. | Formula |
|---|---|
| 140 | |
| 141 | |
| 142 | |
| 143 | |
| 144 | |

TABLE A-continued
| No. | Formula |
|---|---|
| 145 | 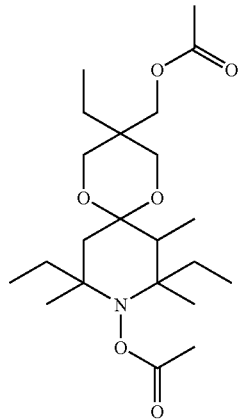 |
| 146 | 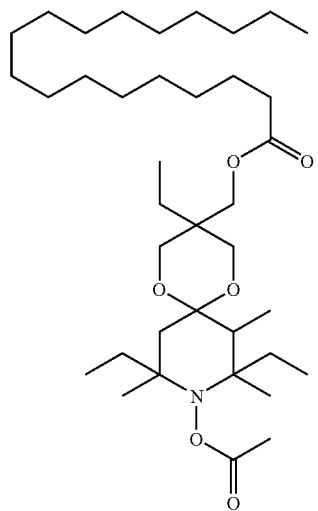 |
| 149 | 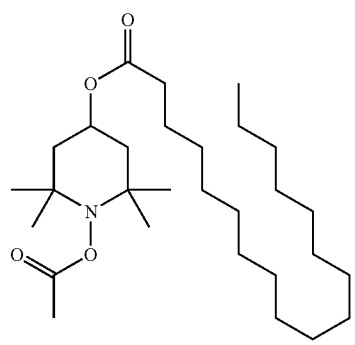 |

TABLE A-continued

| No. | Formula |
|-----|---------|
| 150 | |
| 151 | |
| 152 | |
| 153 | |

TABLE A-continued

| No. | Formula |
|---|---|
| 154 | |
| 155 | |
| 156 | |
| 157 | |
| 158 | |

TABLE A-continued

| No. | Formula |
|---|---|
| 159 | 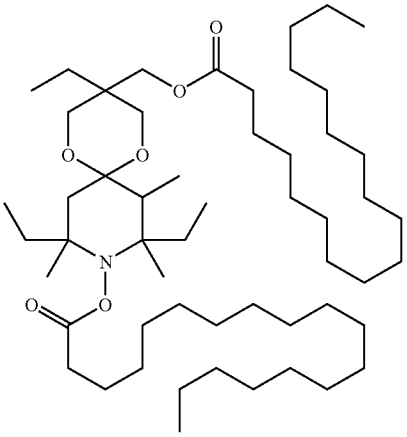 |

Most preferred are compounds 106, 120, 146 and 159.

The preparation of the instant hydroxylamine precursors are for example disclosed in following U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, 5,300,544.

The hydroxylamines are reacted With a suitable acid derivative to form the final hydroxylamine ester. Such esterification processes are known and described in the chemical literature.

The preparation of particularly suitable compounds is described in WO 01/90113.

Preferably the hydroxylamine ester is present in an amount of from 0.01 to 10 weight-%, more preferably between 0.1 to 6 weight-% based on the weight of the unsaturated polymer(s) and monomer(s).

Besides the hydroxylamine ester conventional thermal radical initiators may also be present.

The thermal radical initiator is preferably a bis-azo compound, a peroxide, perester or a hydroperoxide.

Specific preferred radical sources are 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-a-hydroperoxide, cumene hydroperoxide or t-butyl hydroperoxide.

If a thermal radical initiator is present it is preferably added in an amount of 0.01 to 2% by weight, based on the weight of the unsaturated compound or compounds.

The ratio between hydroxylamine ester and thermal radical initiator is preferably from 20:1 to 1:10.

The combination of thermal radical initiator with hydroxylamine ester is particularly advantageous in processes where post curing is performed. While it is desirable to avoid post-cure for economic reasons, such treatments are often necessary since the strength and stiffness of the molded parts may be only 50% of those of a completely cross-linked structure. It is well known that driving the cross-linking reaction to completion by post-curing will increase the duroplastic properties via an increase in strength and modulus of the matrix. The additional use of hydroxylamines contributes to this post-curing by their effective delivery of radicals at higher temperature, compared to the convential thermal radical initiators, which are mostly consumed already in the first curing step.

It is also possible to carry out the process by adding additionally an accelerator. Accelerators are known from from conventional curing with peroxides. They are also useful together with hydroxylamines of the instant invention. Examples have already been mentioned.

A further preferred embodiment is a process wherein the thermal treatment comprises a first curing step and a second post curing step.

The unsaturated polymer resin/monomer compositions can be used without any filler or reinforcement. However, often these unsaturated polymer resin/monomer compositions contain additives for reinforcement and fillers such as for example chalk, glass fibers, quartz, kaolin, talc, aluminum oxide hydrate, MgO, Mg(OH)$_2$, CaO, Ca(OH)$_2$, BaO, Li$_2$O, LiOH, Mg— and Al-alcoholate, Al-ethylhexanoate, Al-benzoate, natural fibers, such as wood or cotton fibers.

Preferred are quartz or glass fiber reinforced unsaturated polyester formulations.

Moreover, between 3 and 80%, preferably between 3 and 25% (based on the unsaturated polymer resin) of thermoplastic compounds (e.g. polyethylene, polystyrene, PMMA, polyvinyl acetate, conventional polyesters and polyester urethanes) can be added mostly to reduce the shrinkage during cross-linkage.

Additionally, the unsaturated polymer resin/monomer composition may contain other additives, for example
  processing stabilizers and antioxidants
    inhibitors for pot life extension (hydrochinone, p-Benzochinone, brenzkatechine, tert.butyl-hydrochinon, 4-tert.butyl-brenzkatechine, 3,5-di-tert.butyl-brenzkatechine, 2,5-di-tert.butyl-hydrochinone, chloranile, hydrochinone monomethylester),
  anti shrink additives (e.g. polystyrene and its copolymers (e.g.SAN-copolymer), PMMA, PVAc, thermoplastic polyurethanes),
  defoaming agents and wetting agents
  UV-absorbers
  plasticisers (e.g. phthalates, polysulfides),
  coupling agents (e.g. silanes like methacryloxypropyltrimethoxysilane, vinyltrimethylsilane, dimethylaminopropyl-trimethoxysilane),
  lubricants (e.g. fine dipersed polyethylene powder, metal salts of stearic acid as Zn-stearate or Ca-stearate; stearic alcohol),
  emulsifiers,
  pigments,
  rheology additives,
  flow-control agents (e.g. MgO, synthetic silicic acid),
  optical brighteners,
  flameproofing agents (chloro paraffine, antimony trioxide, brominated compound, phosphorous containing compounds, alumium trihydroxide trihydrate) and
  antistatic agents.

Further additives such as stable free nitroxyl radicals may also be present. Suitable nitroxyl radicals are for example described in WO 01/42313 or WO 99/67298. These stable free nitroxyl radicals may improve the storage stability of the unsaturated polyester formulation but they may also moderate the crosslinking reaction initiated by the hydroxylamine ester.

Preferably the stable free nitroxyl radical is present in an amount of from 0.001% to 10% by weight based on the weight of the unsaturated polymer(s) and monomer.

These stable sterically hindered nitroxyl free-radicals and their preparation are for example described in EP-A-581 737.

The molar ratio between stable free nitroxyl radical and hydroxylamine ester is preferably 1 100 to 2:1, more preferably from 1:10 to 1:1.

Typical nitroxyl free-radicals are, for example:
bis(1-oxy-2,2,6,6-tetramethylpiperidin-4-yl) sebacate, 4-hydroxy-1-oxy-2,2,6,6-tetramethylpiperidine, 4-ethoxy-1-oxy-2,2,6,6-tetramethylpiperidine, 4-propoxy-1-oxy-2,2,6,6-tetramethylpiperidine, 4-acetamido-1-oxy-2,2,6,6-tetramethylpiperidine, 1-oxy-2,2,6,6-tetramethylpiperidine, 1-oxy-2,2,6,6-tetramethylpiperidin-4-one, 1-oxy-2,2,6,6-tetramethylpiperidin-4-yl acetate, 1-oxy-2,2,6,6-tetramethylpiperidin-4-yl 2-ethylhexanoate, 1-oxy-2,2,6,6-tetramethylpiperidin-4-yl stearate, 1-oxy-2,2,6,6-tetramethylpiperidin-4-yl laureate, 1-oxy-2,2,6,6-tetramethylpiperidin-4-yl 1-oxy-2,2,6,6-tetramethylpiperidin-4-yl benzoate, 1-oxy-2,2,6,6-tetramethylpiperidin-4-yl oleate, 1-oxy-2,2,6,6-tetramethylpiperidin-4-yl 4-tert-butyl-benzoate, bis(1-oxy-2,2,6,6-tetramethylpiperidin-4-yl) succinate, bis(1-oxy-2,2, 6,6-tetramethylpiperidin-4-yl) adipate, bis(1-oxy-2,2,6,6-tetramethylpiperidin-4-yl) n-butylmalonate, bis(1-oxy-2,2, 6,6-tetramethylpiperidin-4-yl) phthalate, bis(1-oxy-2,2,6,6-tetramethylpiperidin-4-yl) isophthalate, bis(1-oxy-2,2,6,6-tetramethylpiperidin-4-yl) terephthalate, bis(1-oxy-2,2,6,6-tetramethylpiperidin-4-yl) hexahydroterephthalate, N,N'-bis (1-oxy-2,2,6,6-tetramethylpiperidinyl)adipamide, N-(1-oxy-2,2,6,6-tetramethylpiperidin-4-yl)caprolactam, N-(1-oxy-2,2,6,6-tetramethylpiperidin-4-yl)dodecylsuccinimide, 2,4,6-tris[N-butyl-N-(1-oxy-2,2,6,6-tetramethylpiperidin-4-yl)]-s-triazine, 4,4'-ethylenebis(1-oxy-2,2,6,6-tetramethylpiperazin-3-one), 2-oxy-1,1,3,3-tetramethyl-2-isobenzazole, 1-oxy-2,2,5,5-tetramethylpyrrolidine and N,N-bis(1,1, 3,3-tetramethylbutyl)nitroxide.

Preferred nitroxyl free-radicals are: bis(1-oxy-2,2,6,6-tetramethylpiperidin-4-yl) sebacate, 4-hydroxy-1-oxy-2,2,6, 6-tetramethylpiperidine, 4-ethoxy-1-oxy-2,2,6,6-tetramethylpiperidine, 4-propoxy-1-oxy-2,2,6,6-tetramethylpiperidine, 4-acetamido-1-oxy-2,2,6,6-tetramethylpiperidine, 1-oxy-2,2,6,6-tetramethylpiperidine and 1-oxy-2,2,6,6-tetramethylpiperidin-4-one.

Bis(1-oxy-2,2,6,6-tetramethylpiperidin-4-yl) sebacate and 4-hydroxy-1-oxy-2,2,6,6-tetramethylpiperidine are especially preferred.

Stable nitroxyl free radicals with higher steric hindrance may be advantageous in some cases such compounds and their preparation are described in GB 2 335 190.

A typical example is 1-oxy-2,6-diethyl-2,3,6-trimethylpiperidin-4-yl acetate.

A further aspect of the invention is a crosslinkable composition comprising an unsaturated polymer resin, a hydroxylamine ester having a structural element according to formula (I) or (I') and optionally a vinyl monomer.

Yet another aspect of the invention is the use of a hydroxylamine ester having a structural element according to formula (I) or (I') for crosslinking unsaturated polymers by applying heat.

Definitions and preferences have been already mentioned and apply also to the composition and use.

The components of the formulation and optionally further additives are mixed at room temperature by known means. Typical devices are kneaders, mixers or rolls. When solid polymers are used they are conveniently pre-dissolved in a suitable monomer. Examples for such polymers and monomers are given above.

The final formulation can for example be casted, spin casted, sprayed, compression moulded or, preferably, injection moulded in a conventional heatable injection device and cured at a temperature between 140° and 250° C.

Such formulated resin compositions are usually referred to as BMC (bulk molding compound), SMC (sheet molding compound), one-step-sandwich-SMC (OSS-SMC), TMC (thick molding compound) or CMC (continuous molding compound). They are well known to people skilled in this art.

Typical articles manufactured by molding processes such as headlight housings and headlight reflectors are made by injection molding of BMC-resin compositions. Spoilers, valve covers, driver cabins, wings, doors, tailgates, interior paneling for trains composite cabins for the front end of trains are made by SMC.

GRP sandwich panels are used for commercial refrigerated vehicle tanks and silos, water and sewage pipes.

Heat can be applied by conventional means, such as in ovens or in electrically heated forms. It is, however, also possible, in particular when coating applications are envisaged, to apply heat by suitable infrared lamps.

Some of the important products based on unsaturated polyester resins are also cast items, such as pearl buttons, knife and umbrella handles, and encapsulated electronic assemblies. Unsaturated polyesters are for example also used for the manufacture of bathroom fixtures. Floor tiles may be manufactured by mixing the unsaturated polyester resin with fillers, such as limestone, silica, china clay and more.

The unsaturated polymer composition of this process is useful for various purposes, for example as printing ink, as a clear finish, as a white finish, for example for wood or metal, as powder coating, as a coating material, inter alia for paper, wood, metal or plastic, as a coating for the marking of buildings and roadmarking, as laminating resins, for producing three-dimensional articles by mass curing, to produce composite materials (for example styrenic polyesters, which may, if desired, contain glass fibres and/or other fibres and other auxiliaries) and other thick-layered compositions, for coating or sealing electronic components and chips, or as coatings for optical fibres.

Further the unsaturated polymer composition of this process is suitable for the preparation of gels with thermotropic properties.

Unsaturated polyester resins are often used in two-component systems together with a monounsaturated monomer, preferably with styrene.

It can also be used for the polymerization of heat-curable powder coatings. The powder coatings can be based on solid resins and monomers containing reactive double bonds, for example maleates, vinyl ethers, acrylates, acrylamides and mixtures thereof. A free-radically heat cured powder coating can be formulated by mixing unsaturated polyester resins with solid acrylamides (for example methyl methylacrylamidoglycolate). Free-radically heat cured powder coatings can also be formulated by mixing unsaturated polyester resins with solid acrylates, methacrylates or vinyl ethers. The powder coatings may additionally comprise white or coloured pigments. For example, preferably rutile-titanium dioxide can be employed in concentrations of up to 50% by weight in order to give a cured powder coating of good hiding power. The procedure normally comprises electrostatic or tribostatic spraying of the powder onto the substrate, for example metal or wood, melting of the powder by heating, and, after a smooth film has formed, curing it at the appropriate temperature.

Coating of the substrates can be carried out by applying to the substrate a liquid composition, a solution or a suspension. The choice of solvents and the concentration depend principally on the type of composition and on the coating technique. The solvent should be inert, i.e. it should not undergo a chemical reaction with the components and should be able to be removed again, after coating, in the course of drying. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

The solution is applied uniformly to a substrate by means of known coating techniques, for example by spin coating, dip coating, knife coating, curtain coating, brushing, spraying, especially by electrostatic spraying, and reverse-roll coating, and also by means of electrophoretic deposition.

The quantity applied (coat thickness) and the nature of the substrate (layer support) are dependent on the desired field of application. The range of coat thicknesses generally comprises values from about 0.1 µm to more than 100 µm.

Also of interest is the use for curing shaped articles made from composite compositions. The composite consists of a self-supporting matrix material, for example a glass fibre fabric, or alternatively, for example, plant fibres [cf. K.-P. Mieck, T. Reussmann in Kunststoffe 85 (1995), 366-370], which is impregnated with the curable formulation. Shaped parts comprising composite compounds, when produced using the hydroxylamine radical sources, attain a high level of mechanical stability and resistance. The unsaturated polyester formulation are particularly useful in moulding, impregnating and coating compositions. Examples of such compositions are gel coat resins, which are subject to stringent requirements regarding curing activity and yellowing resistance, and fibre-reinforced mouldings, for example, light diffusing panels which are planar or have lengthwise or crosswise corrugation. Techniques for producing such mouldings, such as hand lay-up, spray lay-up, centrifugal casting or filament winding, are described, for example, by P. H. Selden in "Glasfaserverstarkte Kunststoffe", page 610, Springer Veriag Berlin-Heidelberg-New York 1967. Examples of articles which can be produced by these techniques are boats, fibre board or chipboard panels with a double-sided coating of glass fibre-reinforced plastic, pipes, containers, etc. Further examples of moulding, impregnating and coating compositions are UP resin gel coats for mouldings containing glass fibres (GRP), such as corrugated sheets and paper laminates. Paper laminates may be based on urea resins or melamine resins. Prior to production of the laminate, the gel coat is produced on a support (for example a film).

Also provided for by the invention is the use of the above-described compositions for the preparation of pigmented and nonpigmented coating materials, printing inks, powder coatings, optical waveguides, optical switches, colourproofing systems, composite compositions, glass fibre cable coatings, the encapsulation of electrical and electronic components, the production of three-dimensional objects and glass faser reinforced articles.

The following examples illustrate the invention.

GENERAL DESCRIPTION

Methods for Characterizing the Curing Process of UP-Resins and the Properties of Resulting Duroplastic Materials Several methods are described for characterizing the curing of UP-resins (see for example: Mona Malig, Veena Choudhary, I. K. Varma, J. M. S.-Rev. Marcromol. Chem. Phys., C40(2&3), 139-165 (2000)). These methods are based either on monitoring rheological properties or on calorimetric methods in dependency on time and/or temperature. As calorimetric effects can be directly linked to chemical reactions, the calorimetry allows a more profound interpretation of the curing process. In accordance with the procedure of Mona Malig et al., the calorimetric method is adapted to the requirements of the instant compositions by measuring at constant heating rate instead of measuring at constant temperature.

Calorimetric Characterization of the Curing Process:

About 20 mg of the UP-resin composition is weighted into an Al-pan, which is tightly closed. The heat flow of the sample in dependency of the temperature is measured within a DSC Mettler Toledo Star System: start temperature: 50° C.; heating rate 10° K/min or 16K/min; end temperature: 250° C.

Generally an exothermic reaction is observed during curing of the UP-resin which leads to an exothermic peak. This peak is evaluated with respect to the starting temperature of the cure process (onset temperature).

The peak area represents the enthalpy of the cure reaction, which can be evaluated from the conversion of the cure reaction by following equation:

Conversion=actual enthalpy/experimentally detected enthalpy at 100% conversion

The reaction speed is characterized by the peak broadness.

Characterization of Content of Residual Monomers:

The content of residual monomers is determined in accordance with DIN 53394 by extracting the duroplastic material with organic solvent ($CH_2Cl_2$ and detecting the amount of monomers by GC-spectroscopy (column: HP-1 (100% Methyl-siloxane). Column length: 25 m, carrier gas: helium; flow: 1.8 ml/min; FID-detection; external standard calibration)

Shore D Hardness:

For determining the Shore D hardness (DIN 53505, ASTM D 2240), duroplastic plates are tested within "Zwick-Härteprüfer Shore D (Werk-Nr.12441)".

Description of General Processing Procedure:

All liquid and solid components are placed in a glass vial and stirred for 15 minutes which leads to a homogeneous mixture. All numbers given in the composition tables are parts by weight.

In accordance with analogous DIN EN ISO 295—"Pressen von Probekörpem aus duroplastischen Werkstoffen", these mixtures are compressed and cured at temperatures between 140° C. and 190° C. within the compression molding equipment (type: Fontijne/Holland, up to 55 kN pressure).

Comparative Examples

The comparative compositions in Table 1 and 2 are mixed by above described procedure and characterized by calorimetry. Additionally, plates were compression molded by standard procedure.

TABLE 1

| Components | V1 | V2 | V3 |
|---|---|---|---|
| Akemi UP-resin | 100 | 100 | 100 |
| Calciumstearate | 2 | 2 | 2 |
| 2,5-Bis-(tert.-butylperoxy) 2,5-dimethylhexane | | 3 | |
| DHBP-45-IC* | | | 6.7 |

*Due to chalk content, this mixture is opaque.

TABLE 2

| Components | V4 | V5 | V6 | V7 | V8 | V9 |
|---|---|---|---|---|---|---|
| Akemi UP-resin | 100 | 100 | 100 | 100 | 100 | |
| Palapreg P17-02 | | | | | | 100 |
| Calciumstearat | 2 | 2 | 2 | 2 | 2 | |
| Zincum PZ | | | | | | 2 |
| Dicumylperoxide | 1 | 3 | 3 | 3 | | |
| Tert. butylperbenzoate | | | | | 1 | 1 |
| Nitroxyl 1 | | | 5 | 1 | | |

Inventive Examples

The inventive compositions in Tables 3-9 were mixed by above described procedure and characterized by calorimetry. Additionally, plates were compression molded by standard procedure.

TABLE 3

| Components | E1 | E2 | E3 | E4 | E5 |
|---|---|---|---|---|---|
| Akemi UP Harz | 100 | 100 | 100 | 100 | 100 |
| Calciumstearat | 2 | 2 | 2 | 2 | 2 |
| Dicumylperoxid | | | | | |
| Compound 2 | | 1 | 3 | 5 | 3 |
| Compound 1 | 1 | | | | |
| Nitroxyl 1 | | | | | 1 |

TABLE 4

| Components | E6 | E7 | E8 | E9 | E10 | E11 |
|---|---|---|---|---|---|---|
| Akemi UP-resin | 100 | 100 | 100 | 100 | 100 | |
| Ca-stearate | 2 | 2 | 2 | 2 | 2 | |
| Palapreg P17-02 | | | | | | 100 |
| Zincum PZ | | | | | | 2 |
| Compound 3 | | | | | 3 | 1 |
| Compound 2 | | 0.5 | 3 | 1.5 | | |
| Compound 4 | 1 | | | | | |
| Dicumylperoxide | | 0.5 | | 1.5 | | |

TABLE 5

| Components | E12 | E13 | E14 |
|---|---|---|---|
| Palapreg P17-02 | 100 | 100 | |
| Atlac XP810 | | | 100 |
| Zincum PZ | 2 | 2 | |
| tert.Butylperbenzoate | | 0.5 | |
| Compound 3 | 0.2 | 1.5 | 2 |

TABLE 6

| Components | E15 | E16 | E17 | E18 | E19 |
|---|---|---|---|---|---|
| Palapreg P17-02 | 100 | 100 | 100 | 100 | 100 |
| Zincum PZ | 2 | 2 | 2 | 2 | 2 |
| Compound 2 | 3 | 3 | 3 | | |
| Compound 3 | | | | 0.5 | 2 |
| Pergaquick A100 | 1 | | 0.5 | 1 | 1 |
| Pergaquick C100 | | 0.2 | 0.2 | | |

TABLE 7

| Components | E20 | E21 | E22 | E23 | E24 |
|---|---|---|---|---|---|
| Palapreg P17-02 | 100 | 100 | 100 | 100 | 100 |
| Zincum PZ | 2 | 2 | 2 | 2 | 2 |
| Compound 3 | 0.2 | 0.2 | 0.2 | 1 | 1 |
| Pergaquick A100 | 0.8 | | | | 1 |
| Leuco-Malachitgreen | | 0.8 | | 1 | |
| Accelerator 101 | | | 0.8 | | |

TABLE 8

| Components | E25 | E26 | E27 | E28 |
|---|---|---|---|---|
| Synolite 1835-N-0 | 35 | | | |
| Synolite 9193-N-0 | 35 | | | |
| Pentaerythrol-tetra-acrylate | | 70 | | |
| Di-allylbisphenol-A-diglycidylether | | | 70 | |
| Phthalsäure-diallylester | 30 | | | 70 |
| Styrene | | 30 | 30 | 30 |
| Compound 2 | 1 | | | |
| Compound 3 | | 2 | 2 | 2 |

TABLE 9

| Components | E29 | E30 | E31 | E32 |
|---|---|---|---|---|
| Kraton D1102 CU | 70 | 70 | | |
| Krylene 1500 | | | 70 | 70 |
| Styrene | 30 | | 30 | |
| MMA | | 30 | | 30 |
| Compound 3 | 2 | 2 | 2 | 2 |

Results:

The results are summarized in Tables 10 and 11 in terms of starting temperature of cure process (onset temperature), monomer conversion, cure rate (peak broadness), content of residual monomers and hardness by Shore D.

TABLE 10

| Example | Temp. onset [° C.] | Calorim. Monomer conversion | Peak broadness [° C.] | Content residual monomers | hardness Shore D |
|---|---|---|---|---|---|
| V1 | No reaction | — | — | — | — |
| V2 | 132 | 14 | — | — | — |
| V3 | 135 | 20 | — | — | — |
| V4 | 141 | *100% | 14 | 0.6% | 80 |
| V5 | 134 | | 14 | 0.5% | 82 |
| V6 | 178 | 54% | 3.0 | 3.3% | 52 |
| V7 | 158 | 70% | 4.4 | 1.1% | 74 |
| E1 | 154 | | 21 | 4.4% | 75 |
| E2 | 150 | | 18 | 0.4% | 85 |
| E3 | 158 | | 17 | <0.1% | 83 |
| E4 | 167 | | 15 | <0.1% | 85 |
| E5 | 179 | 100% | 8.2 | 1.6% | 73 |

*was taken as refence for calculation of the other calorimetric conversions

TABLE 11

| Example | Temp. onset [° C.] (DSC rate) | hardness (proc. temp.) Shore D |
|---|---|---|
| V8 | 127 (16 K/min) | 87 (160° C.) |
| V9 | 132 (10 K/min) | 81 (160° C.) |
| E6 | 140 (16 K/min) | not determined |
| E7 | 132 (16 K/min) | not determined |
| E8 | 152 (16 K/min) | 83 (180° C.) |
| E9 | 134 (16 K/min) | 86 (180° C.) |
| E10 | 148 (16 K/min) | 87 (160° C.) |
| E11 | 162 (10 K/min) | 83 (180° C.) |
| E12 | 166 (10 K/min) | 81 (180° C.) |
| E13 | 143 (10 K/min) | 85 (180° C.) |
| E14 | 164 (10 K/min) | completely cross-linked (180° C.) |
| E15 | 117 (10 K/min) | 86 (180° C.) |
| E16 | 150 (10 K/min) | 81 (180° C.) |
| E17 | 117 (10 K/min) | 82 (180° C.) |
| E18 | 117 (10 K/min) | 88 (180° C.) |
| E19 | 109 (10 K/min) | 86 (170° C.) |
| E20 | 113 (10 K/min) | 85 (170° C.) |
| E21 | 123 (10 K/min) | 78 (170° C.) |
| E22 | 142 (10 K/min) | 84 (170° C.) |
| E23 | 127 (10 K/min) | 81 (170° C.) |
| E24 | 108 (10 K/min) | 85 (170° C.) |
| E25 | 124 (16 K/min) | completely cross-linked (180° C.) |
| E26 | 148 (10 K/min) | completely cross-linked (180° C.) |
| E27 | 137 (10 K/min) | completely cross-linked (180° C.) |
| E28 | 201 (10 K/min) | not determined |
| E29 | 133 (10 K/min) | completely cross-linked (180° C.) |
| E30 | 127 (10 K/min) | completely cross-linked (180° C.) |
| E31 | 141 (10 K/min) | completely cross-linked (180° C.) |
| E32 | 121 (10 K/min) | completely cross-linked (180° C.) |

"completly cross-linked": the hardness measurement is not possible, however solubility tests in $CH_2Cl_2$ show complete cross-linking When peroxides are used, curing starts already at temperatures below 140° C. By adding stable nitroxyl radicals, it is possible to increase the cure temperature, simultaneously the conversion and the mechanical properties are detrimentally influenced.

Within the inventive examples, it can be observed that curing starts only at a temperature above 140° C. Simultaneously, high monomer conversions and equal or better mechanical properties can be observed.

The cure temperature can be further increased by using a combination of stable nitroxyl radical and hydroxylamine ester. 100% monomer conversion and good mechanical hardness is achieved.

On the other hand if accelerators, which are known for the peroxide cure of UP-resins, are added to the instant hydroxylamine esters and unsaturated resins, the cure temperature is also reduced, however storage stability remains high.

Example E33: Crosslinking after Storage

Formulation:
19% UP-resin (Palapreg P18-03 ex DSM Composite Resins)
19% Ethylen-vinylacetate copolymer (low profile additive) ex Aldrich
45% chalk ex Aldrich
15% glass fiber mat ex Owens Corning
1.7% Zinkum PZ ex Baerlocher
0.1% MgO ex Aldrich
0.3% compound 3

The formulation is stored for 6 days at room temperature and subsequently pressed at 190° C. for 5 min at a pressure up to 60 bar. The following table summarizes the results:

TABLE 12

| Example | Hardness Shore D | residual styrene content |
|---|---|---|
| E33 | 77 | 0.5% |

Compounds and Materials Used.

Akemi UP-resin:
"Marmorkitt 1000 Transparent" of Akemi Erich Hontsch GmbH in Nürnberg, contains 30-35% styrene.

Synolite 9193-N-0 ex DSM Composite Resins (monomer-free, amorphous unsaturated polyester based on isophthalic acid and neopentyl glycol)

Synolite 1835-N-0 ex DSM Composite Resins (highly reactive, monomer-free, crystalline unsaturated polyester based on terephthalic acid and neopentyl glycol)

Palapreg P17-02 ex DSM Composite Resins (unsaturated polyester based on o-phthalic acid, dissolved in styrene)

Atlac XP810 ex DSM Composite Resins (vinylester resin dissolved in styrene)

Kraton D 1102 CU ex Shell (poly-styrene-block-butadiene-block-styrene)

Krylene 1500 ex Bayer (SBR: styrene-butadiene rubber)

Pentaerythrol-tetraacrylate ex Aldrich

Di-allyl-bisphenol-A-diglycidylether ex Aldrich

Di-allyl-phthalicacidester ex Merck

Calcium-stearate, purum, ex Riedel-de-Haen,

Zincum PZ ex Baerlocher (Zn-stearate)

Pergaquick A100=N,N-Dimethyl-p-toluidine, ex Pergan GmbH, Bochold, Germany

Pergaquick C100=10% Cobalt-octoate in Xylene, ex Pergan GmbH, Bochold, Germany Leucomalachtitgreen, ex Merck Accelerator 101

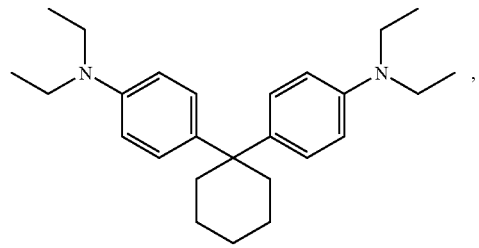

prepared according to Kuder et al.:
J. Org. Chem.; 44; 761 (1979)

Dicumylperoxide, 97%, ex Merck-Schuchardt

Bis-(tert.-butylperoxy)dimethylhexane, technical quality (90%), ex Aldrich

DHBP-45-IC=Diemthyidibutylperoxyhexane 45% coated on chalk, ex Peroxid Chemie

Tert. butylperbenzoate (Peroxan PB) 98% ex Pergan GmbH, Bochold, Germany nitroxyl 1

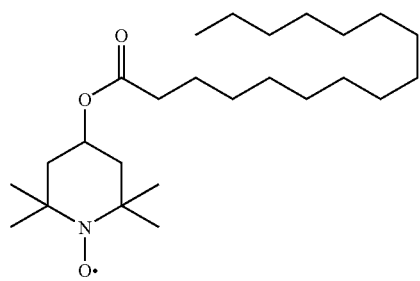

prepared according to WO 99/67298;

-continued compound 1

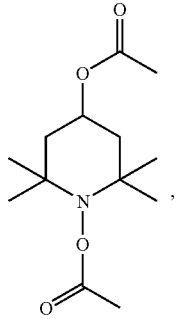

compound 2

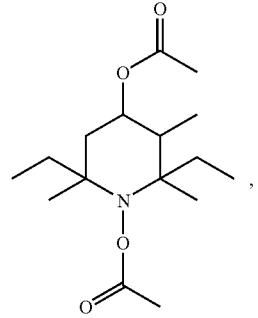

compound 3

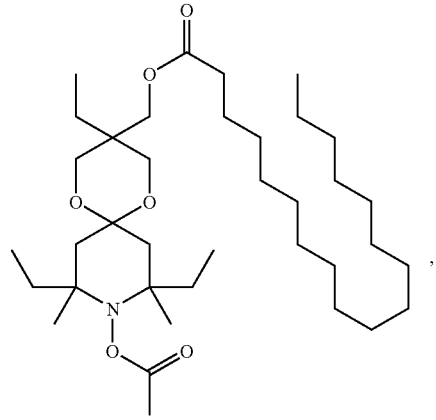

compound 4

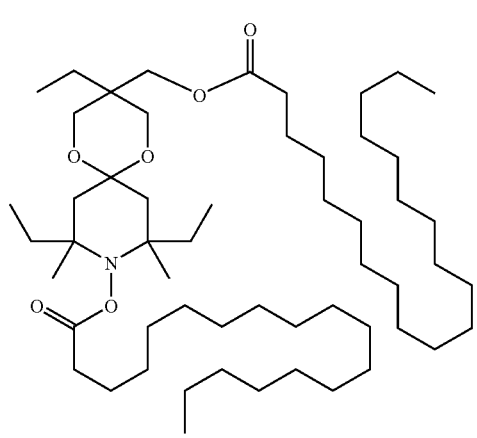

The hydroxylamine esters are prepared according to WO 01/90113

The invention claimed is:

1. A process for crosslinking unsaturated polymer resins, which process comprises heating the polymer resin together with a hydroxylamine ester having a structural element of formula (I) or formula (I') or with a polymeric hydroxylamine ester having a repetitive structural unit of formula (II) or (II')

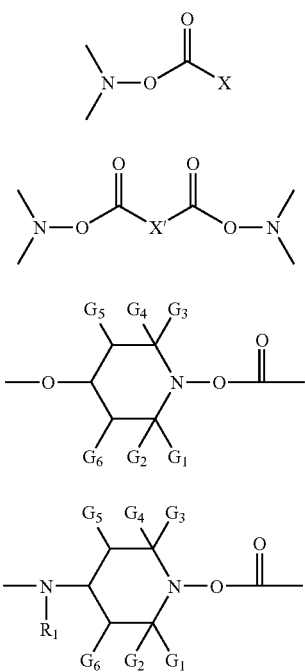

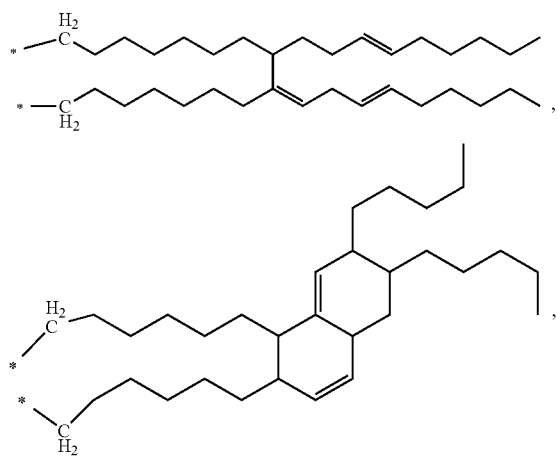

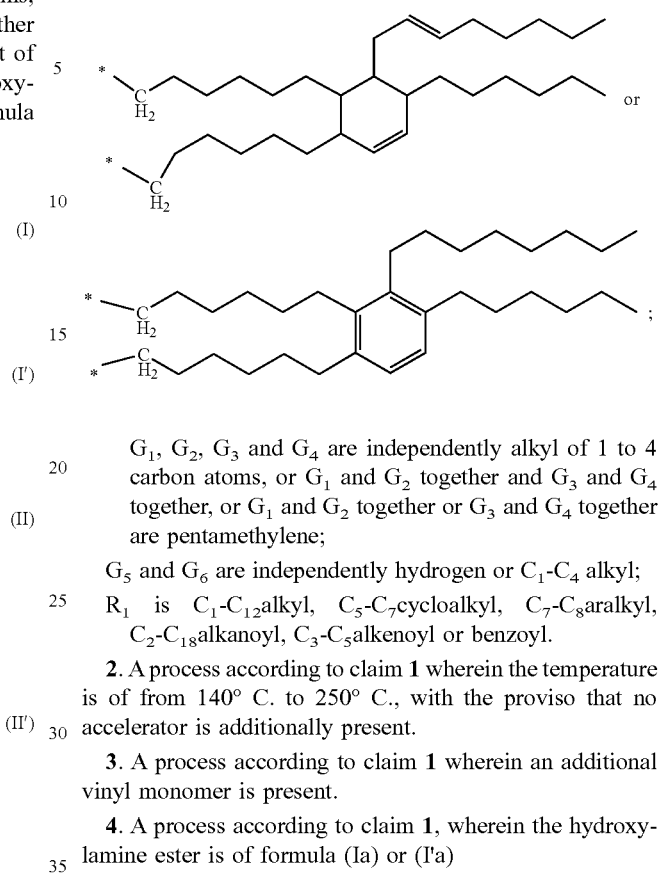

wherein

X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylene, $C_1$-$C_{36}$alkenylene, $C_1$-$C_{36}$alkinylene, -($C_1$-$C_6$alkylen)-phenyl-($C_1$-$C_6$alkylene) or a group

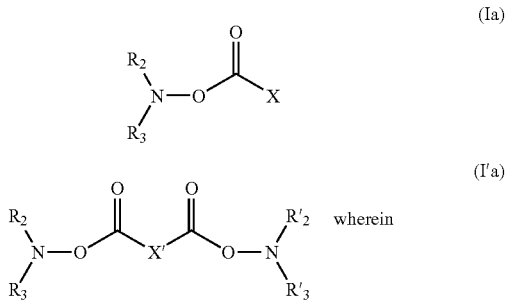

$G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$-$C_4$ alkyl;

$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl.

2. A process according to claim 1 wherein the temperature is of from 140° C. to 250° C., with the proviso that no accelerator is additionally present.

3. A process according to claim 1 wherein an additional vinyl monomer is present.

4. A process according to claim 1, wherein the hydroxylamine ester is of formula (Ia) or (I'a)

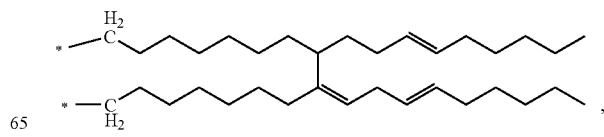

X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylene, $C_1$-$C_{36}$alkenylene, $C_1$-$C_{36}$alkinylene, -($C_1$-$C_6$alkylen)-phenyl-($C_1$-$C_6$alkylene) or a group -continued

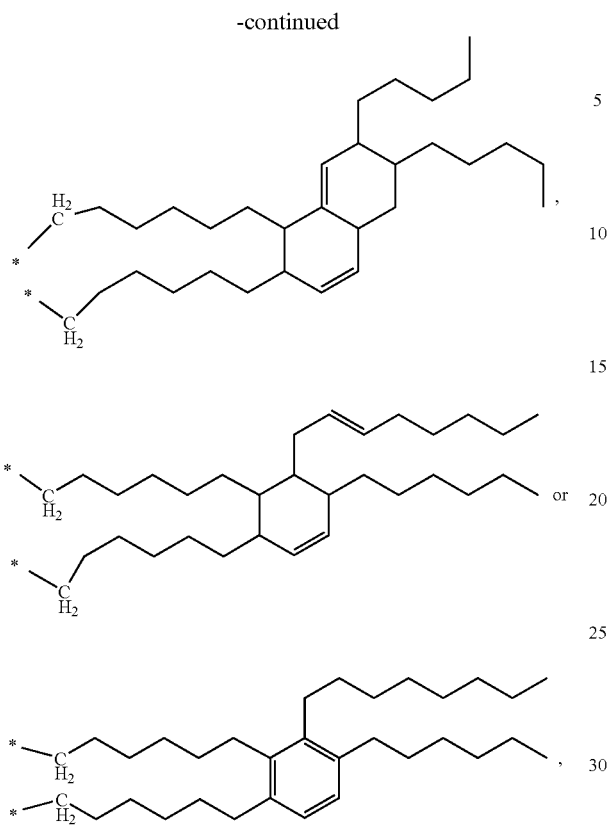

$R_2$, $R_3$, $R_2'$ and $R_3'$ are independently unsubstituted $C_1$-$C_{18}$alkyl, $C_2$-$C_{18}$alkenyl, $C_2$-$C_{18}$alkinyl or with halogen, CN, $NO_2$ or —$COOR_4$ substituted or with O or $NR_4$ interrupted $C_1$-$C_{18}$alkyl, $C_2$-$C_{18}$alkenyl or $C_2$-$C_{18}$alkinyl;

$R_4$ is H, phenyl or $C_1$-$C_{18}$alkyl; or $R_2$ and $R_3$ and/or $R_2'$ and $R_3'$ together with the nitrogen atom to which they are bound form a 5 or 6 membered ring which may be interrupted by a nitrogen or oxygen atom and which may be substituted by one or more $C_1$-$C_6$alkyl groups, carboxyl groups, $C_1$-$C_{18}$alkoxy groups, $C_1$-$C_{18}$alkanoyloxy groups.

5. A process according to claim 1 wherein the structural element of formula (I) is of formulae A to S

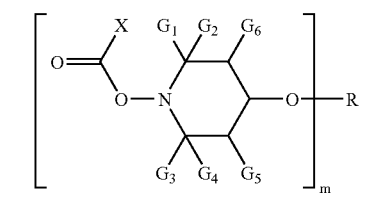

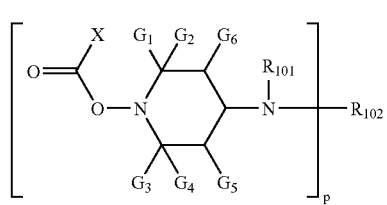

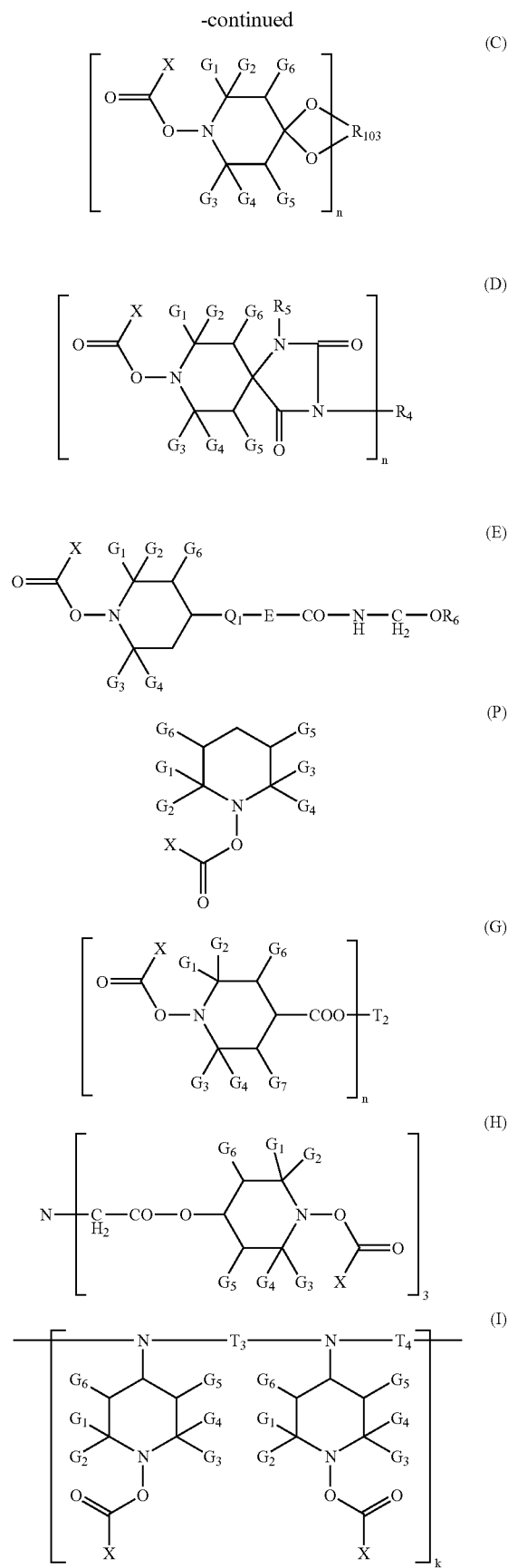

-continued (K)
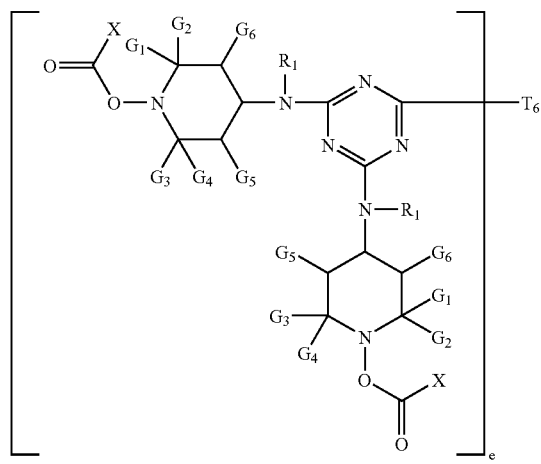

(L)
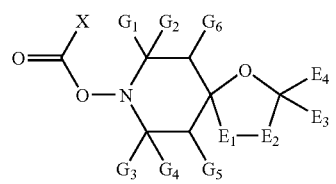

(M)
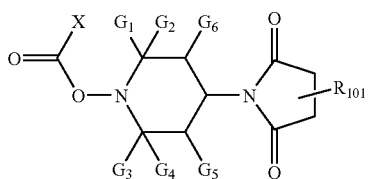

(N)
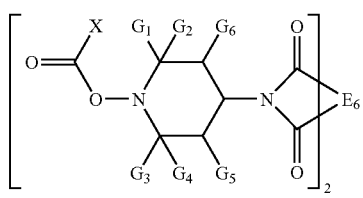

(O)
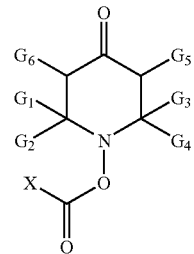

(Q)
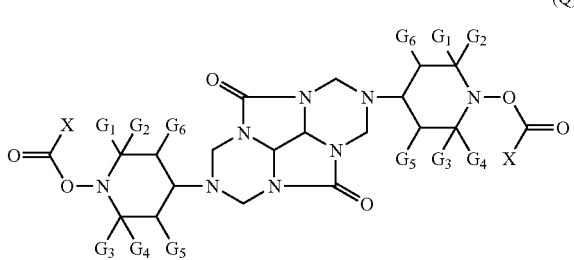

-continued (R)
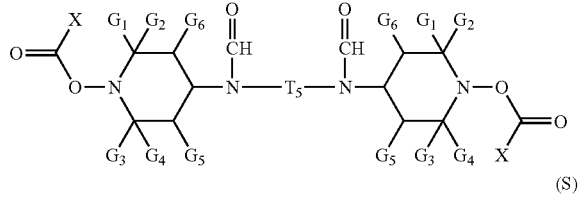

(S)
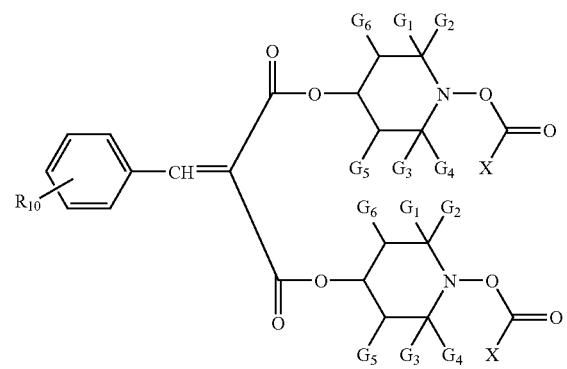

m is 1, 2, 3 or 4;
n is 1 or 2;
wherein
$G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;
$G_5$ and $G_6$ are independently hydrogen or $C_1$-$C_4$ alkyl;
R, if m is 1, is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —COO$Z_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or
R is a monovalent radical of a carbamic acid or phosphorus-containing acid or a monovalent silyl radical;
R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms, where each dicarboxylic acid may be substituted in the aliphatic, cycloaliphatic or aromatic moiety by one or two —COO$Z_{12}$ groups; or
R is a divalent radical of a phosphorus-containing acid or a divalent silyl radical;
R, if m is 3, is a trivalent radical of an aliphatic, cycloaliphatic or aromatic tricarboxylic acid, which may be substituted in the aliphatic, cycloaliphatic or aromatic moiety by —COO$Z_{12}$, of an aromatic tricarbamic acid or of a phosphorus-containing acid, or is a trivalent silyl radical, R, if m is 4, is a tetravalent radical of an aliphatic, cycloaliphatic or aromatic tetracarboxylic acid;

p is 1, 2 or 3, $R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

when p is 1, $R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)-Z or of the formula —CO-Z- or —CONH-Z wherein Z is hydrogen, methyl or phenyl; or when p is 2, $R_{102}$ is $C_2$-$C_{12}$alkylene, $C_6$-$C_{12}$-arylene, xylylene, a —CH$_2$CH(OH)CH$_2$—O—B—O—CH$_2$CH(OH)CH$_2$— group, wherein B is $C_2$-$C_{10}$alkylene, $C_6$-$C_{15}$arylene or $C_6$-$C_{12}$cycloalkylene; or, provided that $R_{101}$ is not alkanoyl, alkenoyl or benzoyl, $R_{102}$ can also be a divalent acyl radical of an aliphatic, cycloaliphatic or aromatic dicarboxylic acid or dicarbamic acid, or can be the group —CO—; or $R_{101}$ and $R_{102}$ together when p is 1 can be the cyclic acyl radical of an aliphatic or aromatic 1,2- or 1,3-dicarboxylic acid; or $R_{102}$ is a group

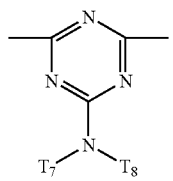

where $T_7$ and $T_8$ are independently hydrogen, alkyl of 1 to 18 carbon atoms, or $T_7$ and $T_8$ together are alkylene of 4 to 6 carbon atoms or 3-oxapentamethylene;

when p is 3, $R_{102}$ is 2,4,6-triazinyl;

when n is 1, $R_{103}$ is $C_2$-$C_8$alkylene or hydroxyalkylene or $C_4$-$C_{32}$acyloxyalkylene; or when n is 2, $R_{103}$ is (—CH$_2$)$_2$C(CH$_2$—)$_2$;

when n is 1, $R_4$ is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$-alkoxyalkyl, $C_6$-$C_{10}$-aryl, glycidyl, a group of formula —(CH$_2$)$_m$—COO-Q or of the formula —(CH$_2$)$_m$—O—CO-Q wherein m is 1 or 2 and Q is $C_1$-$C_4$-alkyl or phenyl; or when n is 2, $R_4$ is $C_2$-$C_{12}$alkylene, $C_6$-$C_{12}$-arylene, a group —CH$_2$CH(OH)CH$_2$—O-D-O—CH$_2$CH(OH)CH$_2$— wherein D is $C_2$-$C_{10}$alkylene, $C_6$-$C_{15}$arylene or $C_6$-$C_{12}$cycloalkylene, or a group —CH$_2$CH(OZ$_1$)CH$_2$—(OCH$_2$CH(OZ$_1$)CH$_2$)$_2$— wherein Z$_1$ is hydrogen, $C_1$-$C_{18}$alkyl, allyl, benzyl, $C_2$-$C_{12}$alkanoyl or benzoyl;

$R_5$ is hydrogen, $C_1$-$C_{12}$alkyl, allyl, benzyl, glycidyl or $C_2$-$C_6$alkoxyalkyl;

$Q_1$ is —N(R$_7$)— or —O—;

E is $C_1$-$C_3$alkylene, the group —CH$_2$CH(R$_8$)—O— wherein R$_8$ is hydrogen, methyl or phenyl, the group —(CH$_2$)$_3$—NH— or a direct bond;

$R_7$ is $C_1$-$C_{18}$alkyl, $C_5$-$C_7$-cycloalkyl, $C_7$-$C_{12}$aralkyl, cyanoethyl, $C_6$-$C_{10}$aryl, the group —CH$_2$CH(R$_8$)—OH; or a group of the formula

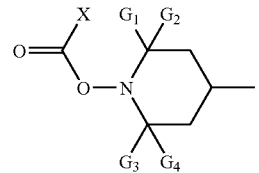

or a group of the formula

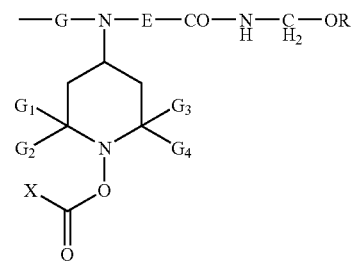

wherein G is $C_2$-$C_6$alkylene or $C_6$-$C_{12}$arylene and R is as defined above; or $R_7$ is a group -E-CO—NH—CH$_2$—OR$_6$;

$R_6$ is hydrogen or $C_1$-$C_{18}$alkyl;

k is 2 to 100;

$R_{10}$ is hydrogen, $C_1$-$C_{12}$alkyl or $C_1$-$C_{12}$alkoxy;

$T_2$ has the same meaning as $R_4$;

$T_3$ and $T_4$ are independently alkylene of 2 to 12 carbon atoms, or $T_4$ is a group

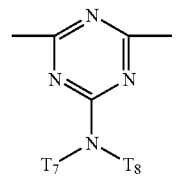

$T_6$ is ——NH(CH$_2$)$_a$—N(CH$_2$)$_b$—N[(CH$_2$)$_c$—N$\frac{}{d}$H where a, b and c are independently 2 or 3, and d is 0 or 1;

e is 3 or 4;

$T_7$ and $T_8$ are independently hydrogen $C_1$-$C_{18}$alkyl, or $T_7$ and $T_8$ together are $C_4$-$C_6$alkylene or 3-oxapenthamethylene;

$E_1$ and $E_2$, being different, each are —CO— or —N(E$_5$)-, where $E_5$ is hydrogen, $C_1$-$C_{12}$alkyl or $C_4$-$C_{22}$alkoxycarbonylalkyl;

$E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms;

$E_4$ is hydrogen, alkyl of 1 to 30 carbon atoms, phenyl, naphthyl or phenylalkyl of 7 to 12 carbon atoms; or $E_3$ and $E_4$ together are polymethylene of 4 to 17 carbon atoms, or said polymethylene substituted by up to four alkyl groups of 1 to 4 carbon atoms;

$E_6$ is an aliphatic or aromatic tetravalent radical;

and X is as defined in claim 1.

6. A process according to claim 5 wherein the hydroxylamine ester is of formula A, B or C.

7. A process according to claim 5 wherein the hydroxylamine ester is of formula A, B or C

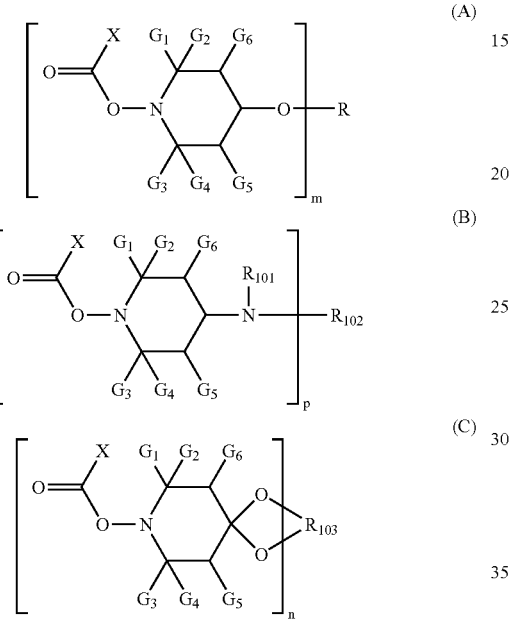

wherein $G_1$, $G_2$, $G_3$ and $G_4$ are methyl or $G_1$ and $G_3$ are methyl and $G_2$ and $G_4$ are ethyl or $G_1$ and $G_2$ are methyl and $G_3$ and $G_4$ are ethyl;

$G_5$ and $G_6$ are independently hydrogen or methyl;

m is 1;

R is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z- or —CONH-Z wherein Z is hydrogen, methyl or phenyl;

n is 1, $R_{103}$ is $C_2$-$C_8$alkylene or hydroxyalkylene or $C_4$-$C_{32}$acyloxyalkylene and X is hydrogen, $C_1$-$C_{36}$alkyl or $C_6$-$C_{10}$aryl.

8. A process according to claim 7 wherein the hydroxylamine ester is of formula A;

$G_1$, $G_2$, $G_3$ and $G_4$ are methyl or $G_1$ and $G_3$ are methyl and $G_2$ and $G_4$ are ethyl;

$G_5$ and $G_6$ are independently hydrogen or methyl;

m is 1;

R is hydrogen, $C_1$-$C_{18}$alkyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms.

9. A process according to claim 1 wherein the hydroxylamineester is a oligomer or polymer obtainable by reacting a dicarboxylic acid or a dicarboxylic acid derivative with a compound of formula A1 or B1 or by reacting a diisocyanate with a compound of formula A1

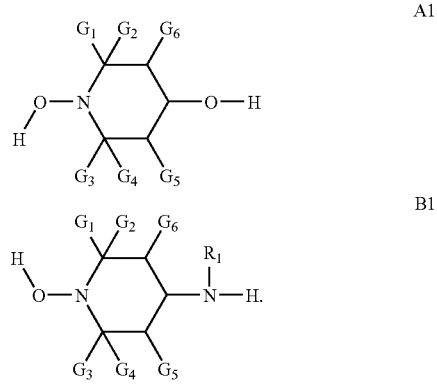

10. A process according to claim 3 wherein the hydroxylamine ester is present in an amount of from 0.01 to 10 weight-% based on the weight of the unsaturated polymer(s) and monomer(s).

11. A process according to claim 1 wherein additionally a stable free nitroxyl radical is present.

12. A process according to claim 1 wherein additionally an azo-compound, a peroxide, a perester or a hydroperoxide is present.

13. A process according to claim 1 wherein additionally an accelerator is present.

14. A process according to claim 1 wherein the thermal treatment comprises a first curing step and a second post curing step.

* * * * *